US012748540B2

(12) United States Patent
Kim et al.

(10) Patent No.: US 12,748,540 B2
(45) Date of Patent: Sep. 29, 2026

(54) SUB BLOCK BASED STORAGE DEVICE AND METHOD FOR MANAGING SUB BLOCK THEREOF

(71) Applicant: SAMSUNG ELECTRONICS CO., LTD., Suwon-si (KR)

(72) Inventors: Dongin Kim, Suwon-si (KR); Youngjo Park, Suwon-si (KR); Seungjun Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/908,260

(22) Filed: Oct. 7, 2024

(65) Prior Publication Data

US 2025/0244892 A1 Jul. 31, 2025

(30) Foreign Application Priority Data

Jan. 31, 2024 (KR) ........................ 10-2024-0014821

(51) Int. Cl.
*G06F 3/06* (2006.01)

(52) U.S. Cl.
CPC .......... *G06F 3/0631* (2013.01); *G06F 3/0614* (2013.01); *G06F 3/0644* (2013.01); *G06F 3/0673* (2013.01)

(58) Field of Classification Search
CPC ........................................................ G06F 3/06
See application file for complete search history.

(56) References Cited

U.S. PATENT DOCUMENTS

| | | | | |
|---|---|---|---|---|
| 6,219,772 | B1 * | 4/2001 | Gadangi | G06F 12/023 711/170 |
| 9,583,201 | B1 | 2/2017 | Lee | |
| 10,614,891 | B2 | 4/2020 | Park et al. | |
| 11,287,989 | B2 | 3/2022 | Mishra et al. | |
| 11,456,050 | B2 | 9/2022 | Chandramani et al. | |
| 11,487,454 | B2 | 11/2022 | Nishikawa et al. | |

(Continued)

FOREIGN PATENT DOCUMENTS

| | | | |
|---|---|---|---|
| JP | 4691348 | B2 | 6/2011 |
| KR | 10-0723504 | B1 | 5/2007 |
| KR | 10-2312404 | B1 | 10/2021 |

OTHER PUBLICATIONS

S. Teshome and T.-S. Chung, "A Tri-Pool Dynamic Wear-Leveling Algorithm for Large Scale Flash Memory Storage Systems," 2011 International Conference on Information Science and Applications, Jeju, Korea (South), 2011, pp. 1-6. (Year: 2011).*

*Primary Examiner* — Khoa D Doan
(74) *Attorney, Agent, or Firm* — Sughrue Mion, PLLC

(57) ABSTRACT

A storage device includes: memory device including a plurality of memory blocks, each of the plurality of memory blocks comprising a plurality of sub-blocks, wherein at least two sub-blocks of the plurality of sub-blocks have different sizes; and a memory controller configured to manage the plurality of memory blocks and the plurality of sub-blocks, wherein the memory controller is further configured to: based on a predetermined sub-block attribute criteria, select at least one sub-block from the plurality of sub-blocks, add the selected at least one sub-block to at least one sub-block pool, and based on the predetermined sub-block attribute criteria, allocate the selected at least one sub-block in the at least one sub-block pool to a virtual memory block.

20 Claims, 20 Drawing Sheets

(56) References Cited

U.S. PATENT DOCUMENTS

| | | | | |
|---|---|---|---|---|
| 11,646,081 | B2 | 5/2023 | Yang et al. | |
| 2004/0080985 | A1* | 4/2004 | Chang | G06F 12/0246 711/E12.008 |
| 2011/0107052 | A1* | 5/2011 | Narayanasamy | G06F 3/0608 711/170 |
| 2013/0311705 | A1* | 11/2013 | Cheng | G06F 12/0246 711/E12.008 |
| 2018/0046556 | A1* | 2/2018 | Marathe | G06F 3/0604 |

* cited by examiner

SUB BLOCK BASED STORAGE DEVICE AND METHOD FOR MANAGING SUB BLOCK THEREOF

CROSS-REFERENCE TO RELATED APPLICATIONS

This application is based on and claims priority under 35 U.S.C. § 119 to Korean Patent Application No. 10-2024-0014821 filed, on Jan. 31, 2024, in the Korean Intellectual Property Office, the disclosure of which is incorporated by reference herein in its entirety.

BACKGROUND

1. Field

The disclosure relates to a storage device including a semiconductor memory device, and more particularly, relates to a sub-block based storage device and a method for managing a sub-block.

2. Description of Related Art

A semiconductor memory may be mainly classified as a volatile memory or a non-volatile memory. Read and write speeds of the volatile memory (for example, a dynamic random access memory (DRAM) or a static random access memory (SRAM)) are fast, but the data stored in the volatile memory disappear when a power is turned off. In contrast, the non-volatile memory may retain data even when the power is turned off. Therefore, the non-volatile memory may be used to store contents to be preserved regardless of whether power is supplied or not.

A representative example of the non-volatile memory is a flash memory. The flash memory is widely used as a storage medium for audio and video data in information devices such as a computer and a smartphone. Recently, high-capacity, high-speed input/output and low-power technologies for the flash memory are being actively researched for installation in mobile devices such as the smartphone.

A storage device using the flash memory may include memory blocks. In order to use the memory blocks efficiently, the storage device may divide the memory blocks into multiple groups and manage the multiple groups as sub-blocks.

SUMMARY

Provided is a storage device managing sub-blocks which optimize user patterns, requirements and constraints by using sub-blocks with different characteristics in combination.

According to an aspect of the disclosure, a storage device includes: memory device including a plurality of memory blocks, each of the plurality of memory blocks comprising a plurality of sub-blocks, wherein at least two sub-blocks of the plurality of sub-blocks have different sizes; and a memory controller configured to manage the plurality of memory blocks and the plurality of sub-blocks, wherein the memory controller is further configured to: based on a predetermined sub-block attribute criteria, select at least one sub-block from the plurality of sub-blocks, add the selected at least one sub-block to at least one sub-block pool, and based on the predetermined sub-block attribute criteria, allocate the selected at least one sub-block in the at least one sub-block pool to a virtual memory block.

According to an aspect of the disclosure, a method performed by a storage device comprising a plurality of memory blocks, includes: based on a predetermined sub-block attribute criteria, selecting at least one sub-block from a plurality of sub-blocks in the plurality of memory blocks; according to a predetermined sub-block attribute criteria to adding the selected at least one sub-block to a sub-block pool; and based on the predetermined sub-block attribute criteria, allocating the selected at least one sub-block in the sub-block pool to a virtual memory block, wherein at least two sub-blocks of the plurality of sub-blocks have different sizes.

According to an aspect of the disclosure, a method performed by a storage device, includes: receiving, from a host, a virtual memory block allocation requirement; confirming the virtual memory block allocation requirement; based on the virtual memory block allocation requirement, selecting at least one sub-block; selecting a sub-block pool and adding the selected at least one sub-block to the selected sub-block pool; combining a virtual memory block using the selected at least one sub-block of the selected sub-block pool; comparing the combined virtual memory block and the virtual memory block allocation requirement and checking whether the virtual memory block allocation requirement is satisfied; and based on a determination that the virtual memory block allocation requirement is satisfied, allocating the virtual memory block.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Before undertaking the detailed description below, it may be advantageous to set forth definitions of certain words and phrases used throughout the disclosure. The terms “include” and “comprise”, and the derivatives thereof refer to inclusion without limitation. The term “or” is an inclusive term meaning “and/or”. The phrase “at least one of,” when used with a list of items, means that different combinations of one or more of the listed items may be used, and only one item in the list may be needed. For example, “at least one of A, B, and C” includes any of the following combinations: A, B, C, A and B, A and C, B and C, and A and B and C, and any variations thereof. As an additional example, the expression “at least one of a, b, or c” may indicate only a, only b, only c, both a and b, both a and c, both b and c, all of a, b, and c, or variations thereof. Similarly, the term “set” means one or more. Accordingly, the set of items may be a single item or a collection of two or more items.

Terms used in the disclosure are used only to describe a specific embodiment, and may not be intended to limit the scope of another embodiment. A singular expression may include a plural expression unless it is clearly meant differently in the context. The terms used herein, including a technical or scientific term, may have the same meaning as generally understood by a person having ordinary knowledge in the technical field described in the disclosure. Terms defined in a general dictionary among the terms used in the disclosure may be interpreted with the same or similar meaning as a contextual meaning of related technology, and unless clearly defined in the disclosure, it is not interpreted in an ideal or excessively formal meaning. In some cases, even terms defined in the disclosure cannot be interpreted to exclude embodiments of the disclosure.

In one or more embodiments of the disclosure described below, a hardware approach is described as an example. However, since the one or more embodiments of the disclosure include technology that uses both hardware and software, the various embodiments of the disclosure do not exclude a software-based approach.

In addition, in the disclosure, in order to determine whether a specific condition is satisfied or fulfilled, an expression of more than or less than may be used, but this is only a description for expressing an example, and does not exclude description of more than or equal to or less than or equal to. A condition described as ‘more than or equal to’ may be replaced with ‘more than’, a condition described as ‘less than or equal to’ may be replaced with ‘less than’, and a condition described as ‘more than or equal to and less than’ may be replaced with ‘more than and less than or equal to’.

Below, example embodiments of the disclosure will be described in detail and clearly to such an extent that an ordinary one in the art easily implements the aspects of the disclosure.

Figure 1:
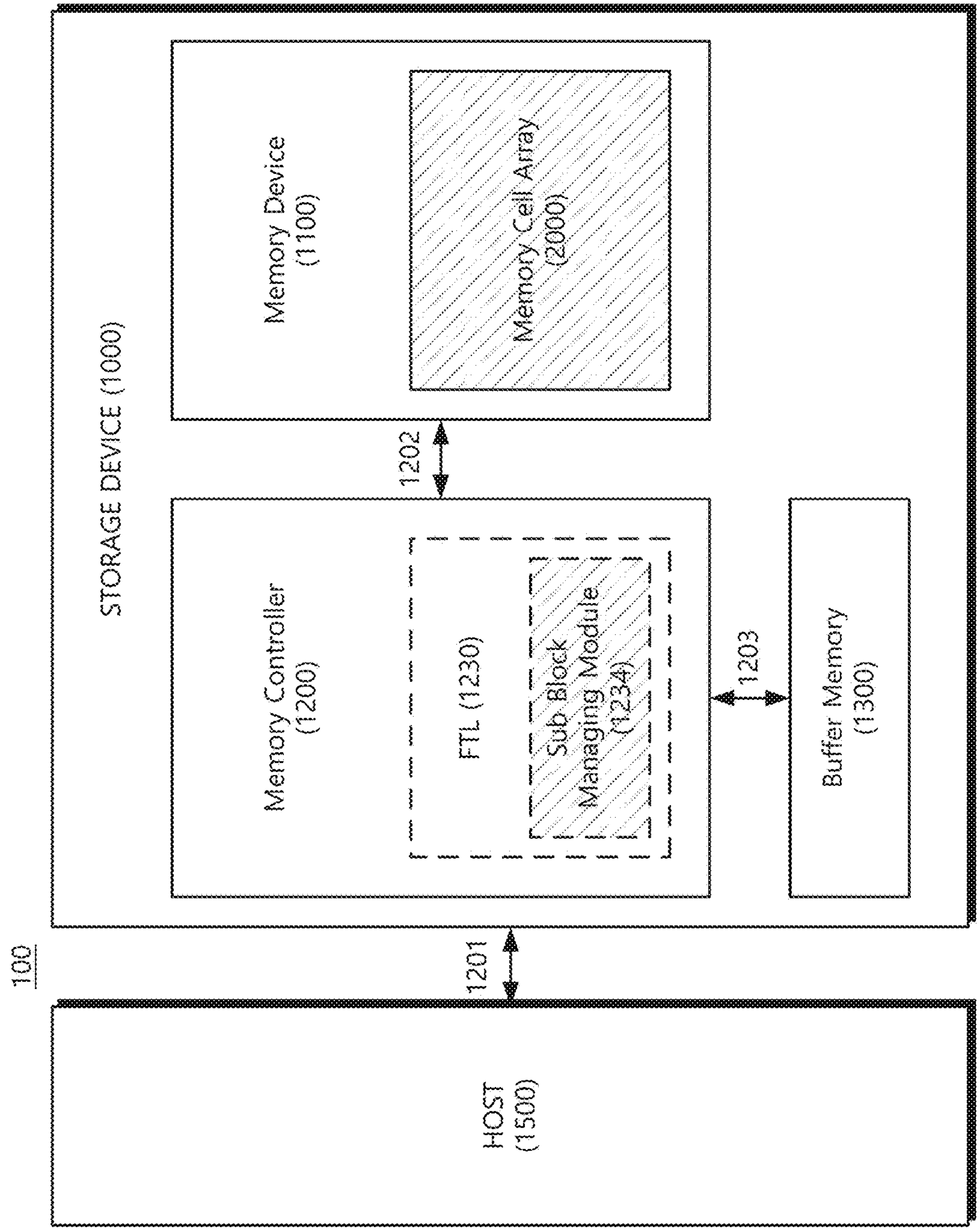
FIG. 1 is a block diagram illustrating a user device according to an example embodiment.

FIG. 1 is a block diagram illustrating a user device according to an example embodiment. Referring to FIG. 1, a user device 100 may include a storage device 1000 and a host 1500. The storage device 1000 and the host 1500 may be connected through a host interface 1201. The host interface 1201 may be a standard interface such as ATA, SATA, PATA, USB, SCSI, ESDI, IEEE 1394, IDE, and/or card interface, etc.

According to an example embodiment, the storage device 1000 may be a storage device based on a non-volatile memory. For example, the storage device 1000 may include a memory device 1100, a memory controller 1200, and a buffer memory 1300. The memory device 1100 may be a non-volatile memory such as a flash memory or phase change memory (PRAM). When the memory device 1100 is a flash memory, the storage device 1000 may be a flash storage device based on the flash memory. For example, the storage device 1000 may be an SSD, UFS, and/or memory card, etc. The buffer memory 1300 may include volatile memory (for example, DRAM).

According to an example embodiment, the memory device 1100 may be connected to the memory controller 1200 through a memory interface 1202. The memory device 1100 may include a memory cell array 2000 and a peripheral circuit. The peripheral circuitry may include all analog or digital circuits required to store or read data in the memory cell array 2000.

According to an example embodiment, the peripheral circuit may receive external power from the memory controller 1200 and generate multiple levels of internal power. The peripheral circuit may receive commands, addresses, and data from the memory controller 1200, and store the data in the memory cell array 2000 according to the control signals. Additionally, the peripheral circuit may read data stored in the memory cell array 2000 and provide the data to the memory controller 1200.

According to an example embodiment, the memory cell array 2000 may include a plurality of memory blocks. Each memory block may have a vertical three-dimensional structure. Each memory block may include a plurality of memory cells. Multi-bit data may be stored in each memory cell. For example, the memory device 1100 may be a TLC flash memory capable of storing 3 bits of data in one memory cell.

According to an example embodiment, the memory cell array 2000 may be located next to or above the peripheral circuit due to the design arrangement structure. The structure in which the memory cell array 2000 is located above the peripheral circuit is called a cell-on-peripheral (COP) structure. The memory cell array 2000 may be manufactured as a separate chip from the peripheral circuit. The upper chip including the memory cell array 2000 and the lower chip including the peripheral circuit may be connected to each other using a bonding method. This structure is called chip-to-chip (C2C) structure.

According to an example embodiment, the memory controller 1200 may be connected between the memory device 1100 and the host 1500. Additionally, the memory controller 1200 may be connected between the buffer memory 1300 and the host 1500. The memory controller 1200 may control read or write operations of the memory device 1100 and/or the buffer memory 1300, based on a request from the host 1500. The memory controller 1200 may receive host data from the host 1500 and provide the host data to the memory device 1100 and/or the buffer memory 1300.

According to an example embodiment, the memory controller 1200 may include a control unit (or a controller) and a work memory. The control unit may control overall operations of the memory controller 1200. For example, the control unit may control a flash translation layer (FTL) 1230 to perform an address mapping operation. The control unit may be a commercially available or custom microprocessor.

According to an example embodiment, the work memory may be cache memory (for example, a SRAM). The work memory may serve as a buffer memory that temporarily stores data. Additionally, the work memory may be a driving memory of the memory controller 1200. The work memory may drive the FTL 1230.

According to an example embodiment, the FTL 1230 may be firmware or a program for efficiently managing the memory device 1100. The memory device 1100 may not support an overwrite function different from a hard disk drive. Therefore, the memory device 1100 may perform the following process while updating data written to the page. First, the memory device 1100 may copy all valid data in the first memory block to which the written page belongs to an empty second memory block. Second, the memory device 1100 may erase the first memory block and make the first memory block an empty memory block. The memory device 1100 may perform a large number of page copy operations (for example, a page read operation and/or a page write operation) and erase operations while going through this process.

According to an example embodiment, the FTL 1230 may be used between the host 1500 and the memory device 1100 to reduce the number of page copy and erase operations. The FTL 1230 may perform an address mapping function, a garbage collection function, and a wear-leveling function, etc. When an overwrite request is received from the host 1500, the address mapping function may write the corresponding data to another empty page instead of overwriting the original page, thereby reducing additional page copy and block erase operations. For this purpose, an address mapping table having a specified size must be maintained in the work memory and the buffer memory 1300. Through this, the FTL 1230 may manage an operation of mapping a logical address received from the host 1500 to a physical address in the memory device 1100.

According to an example embodiment, the FTL 1230 may include a sub-block managing module 1234 (or a sub-block manager 1234). The sub-block managing module 1234 may manage a plurality of memory blocks included in the memory cell array 2000 of the memory device 1100 as a plurality of super blocks. The sub-block managing module 1234 may match the plurality of memory blocks to each of the plurality of super blocks. The sub-block managing module 1234 may manage an address mapping table corresponding to the plurality of super blocks.

According to an example embodiment, the buffer memory 1300 may be connected to the memory controller 1200 through a buffer interface 1203. For example, the buffer memory 1300 may be used to temporarily store data to be stored in or read from the memory device 1100. Additionally, a cache area capable of storing cache data may be allocated to the buffer memory 1300. The buffer memory 1300 may be implemented with a DRAM and a SRAM, etc. The buffer memory 1300 may be included in the memory device 1100 or the memory controller 1200.

According to an example embodiment, the host 1500 may include a processor (or at least one processor) and a host memory (or at least one host memory). The processor and the host memory may be connected via an address/data bus. The host 1500 may be a personal digital assistance (PDA), a computer, a digital audio player, a digital camera, and/or a mobile phone, etc. The host memory may be a non-volatile or volatile memory in the form of a cache, a ROM, a PROM, an EPROM, an EEPROM, a flash, a SRAM, a DRAM, or the like.

According to an example embodiment, the host memory may drive a plurality of software or firmware. For example, the host memory may drive an operating system (OS), applications, a file system, a memory manager, and I/O drivers, etc.

Figure 2:
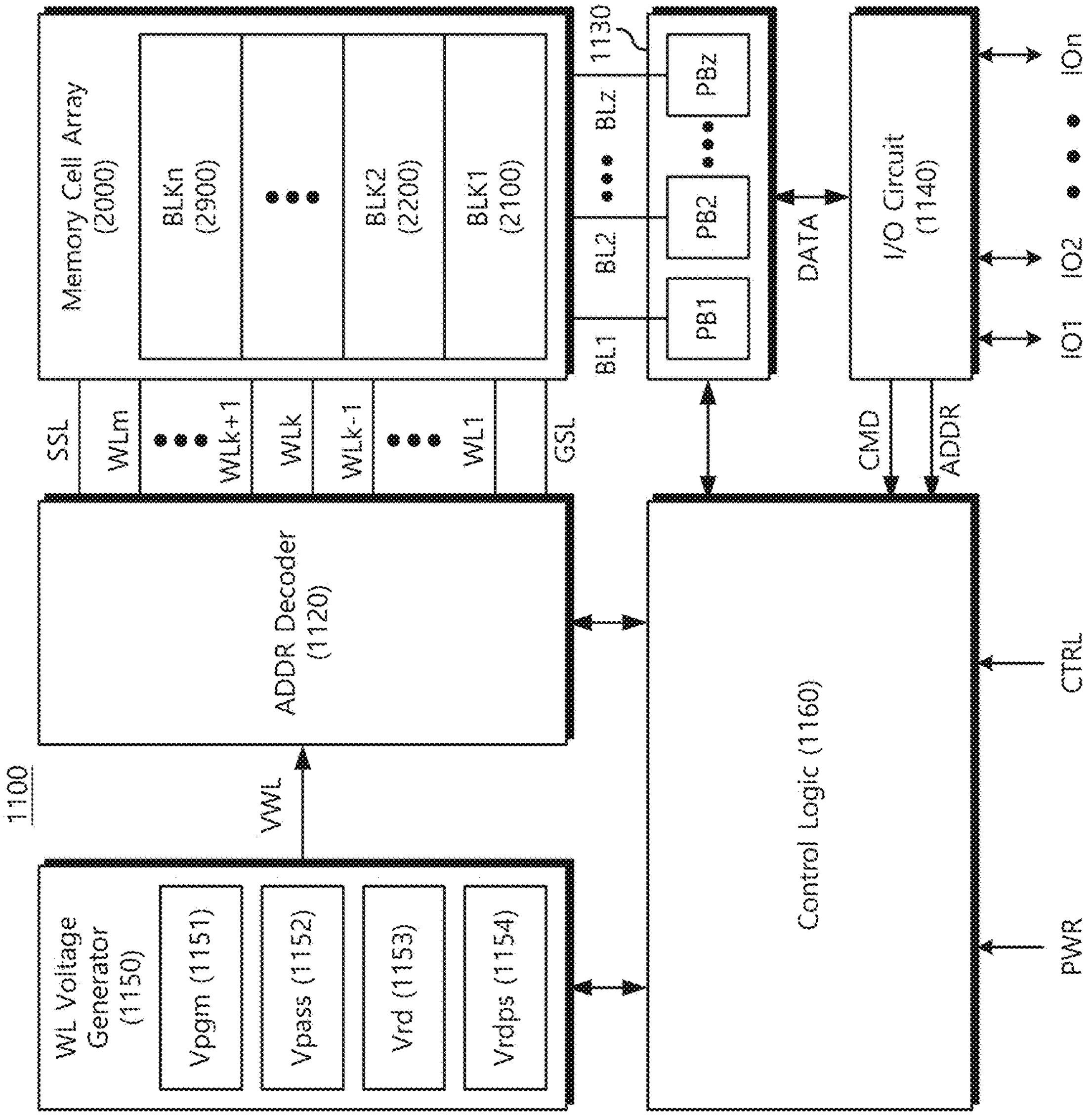
FIG. 2 is a block diagram illustrating as an example embodiment of a memory device illustrated in FIG. 1.

FIG. 2 is a block diagram illustrating as an example embodiment of a memory device illustrated in FIG. 1. The storage device 1000 of FIG. 1 may be a flash storage device based on flash memory. For example, the storage device 1000 may be implemented as a solid state device (SSD), a universal flash storage (UFS) and/or a memory card, etc.

Referring to FIGS. 1 and 2, the memory device 1100 may include a memory cell array 2000 and a peripheral circuit 1115. The peripheral circuit 1115 may include an address decoder 1120, a page buffer circuit 1130, an input/output circuit 1140, a word line voltage generator 1150 and/or control logic 1160.

According to an example embodiment, the memory cell array 2000 may include a plurality of memory blocks BLK1 to BLKn. Each memory block may be configured as a plurality of pages. Each page may include a plurality of memory cells. Each memory cell may store multi-bit data (for example, two or more bits). Each memory block may correspond to an erase unit, and each page may correspond to a read and/or write unit.

According to an example embodiment, the memory cell array 2000 may be formed in a direction perpendicular to a substrate. A gate electrode layer and an insulation layer may be alternately deposited on the substrate. Each memory block (for example, BLK1) may be connected to one or more string selection lines SSL, a plurality of word lines WL1 to WLm, and one or more ground selection lines GSL. WLk is a selected word line and the remaining word lines WL1 to WLk−1 and WLk+1 to WLm are unselected word lines.

According to an example embodiment, the address decoder 1120 may be connected to the memory cell array 2000 through selection lines SSL and GSL and word lines WL1 to WLm. The address decoder 1120 may select a word line during a program or read operation. The address decoder 1120 may receive the word line voltage VWL from the word line voltage generator 1150 and provide a program voltage or read voltage to the selected word line.

According to an example embodiment, the page buffer circuit 1130 may be connected to the memory cell array 2000 through bit lines BL1 to BLz. The page buffer circuit 1130 may temporarily store data to be stored in the memory cell array 2000 or data read from the memory cell array 2000. The page buffer circuit 1130 may include page buffers PB1 to PBz connected to respective bit lines. Each page buffer may include a plurality of latches to store or read multi-bit data.

According to an example embodiment, the input/output circuit 1140 may be internally connected to the page buffer circuit 1130 through data lines and externally connected to the memory controller 1200 (shown in FIG. 1) through the input/output lines IO1 to IOn. The input/output circuit 1140 may receive program data from the memory controller 1200 during a program operation. Also, the input/output circuit 1140 may provide data read from the memory cell array 2000 to the memory controller 1200 during a read operation.

According to an example embodiment, the word line voltage generator 1150 may receive internal power from the control logic 1160 and generate a word line voltage VWL required to read or write data. The word line voltage VWL may be provided to a selected word line sWL or unselected word lines uWL through the address decoder 1120.

According to an example embodiment, the word line voltage generator 1150 may include a program voltage generator 1151 and a pass voltage generator 1152. The program voltage generator 1151 may generate a program voltage Vpgm provided to the selected word line sWL during a program operation. The pass voltage generator 1152 may generate a pass voltage Vpass provided to the selected word line sWL and the unselected word lines uWL.

According to an example embodiment, the word line voltage generator 1150 may include a read voltage generator 1153 and a read pass voltage generator 1154. The read voltage generator 1153 may generate a select read voltage Vrd provided to the select word line sWL during a read operation. The read pass voltage generator 1154 may generate a read pass voltage Vrdps provided to unselected word lines uWL. The read pass voltage Vrdps may be a voltage sufficient to turn on memory cells connected to the unselected word lines uWL during a read operation.

According to an example embodiment, the control logic 1160 may control operations such as read, write, and erase of the memory device 1100 using commands CMD, addresses ADDR and/or control signals CTRL provided from the memory controller 1200. The addresses ADDR may include a block selection address for selecting one memory block, a row address for selecting one page and/or a column address for selecting one memory cell.

Figure 3:
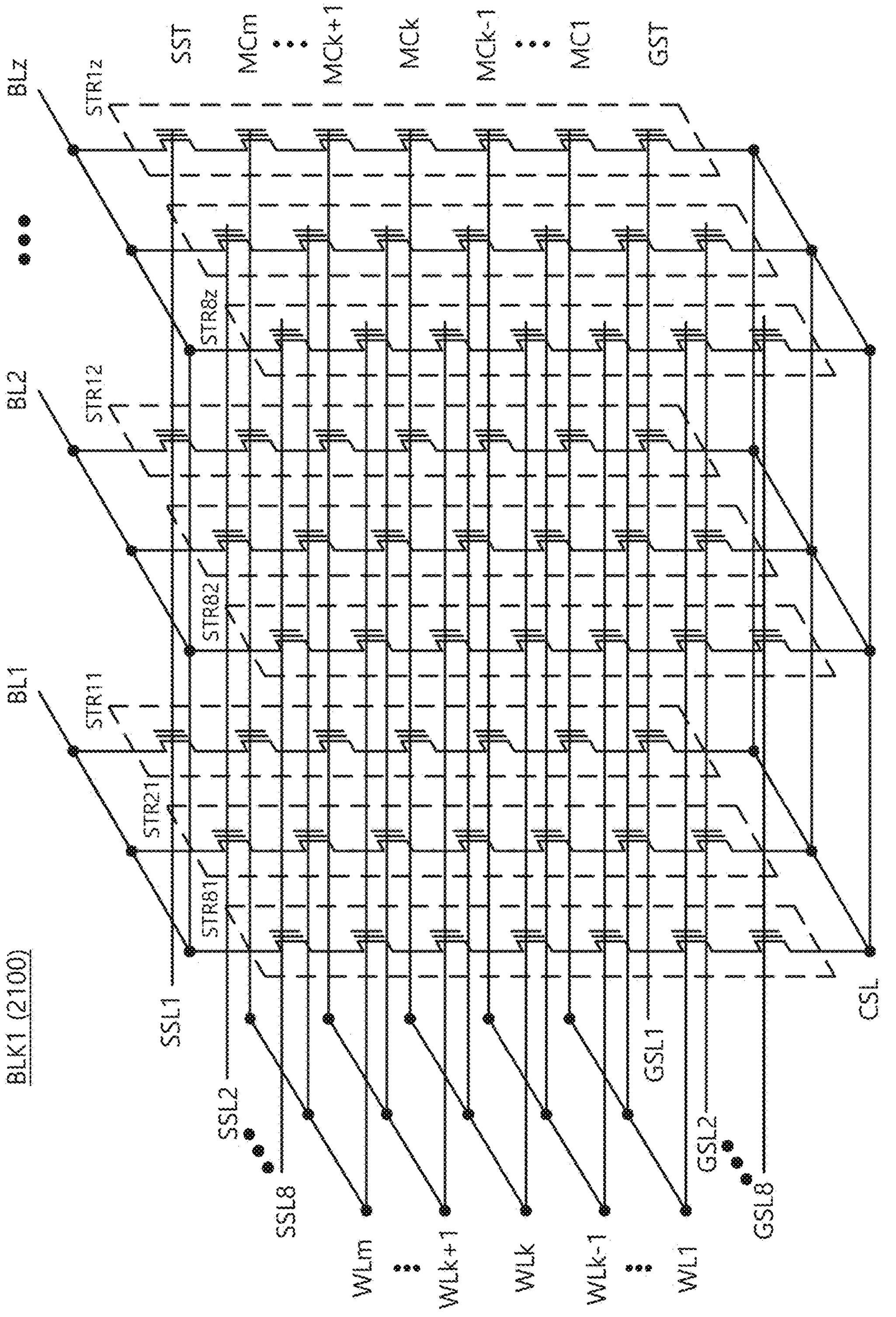
FIG. 3 is a circuit diagram illustrating an example embodiment of a memory block BLK1 of a memory cell array illustrated in FIG. 2.

FIG. 3 is a circuit diagram illustrating an example embodiment of a memory block BLK1 of a memory cell array illustrated in FIG. 2. Referring to FIG. 3, in the memory block BLK1, a plurality of cell strings STR11 to STR8*z* may be formed between the bit lines BL1 to BLz and a common source line CSL. Each cell string may include a string selection transistor SST, a plurality of memory cells MC1 to MCm and/or a ground selection transistor GST.

According to an example embodiment, the string selection transistors SST may be connected with string selection lines SSL1 to SSL8. The ground selection transistors GST may be connected with ground selection lines GSL1 to GSL8. The string selection transistors SST may be connected with the bit lines BL1 to BLZ, and the ground selection transistors GST may be connected with the common source line CSL.

According to an example embodiment, the first to m-th word lines WL1 to WLm may be connected with the plurality of memory cells MC1 to MCm in a row direction. The first to z-th bit lines BL1 to BLz may be connected with the plurality of memory cells MC1 to MCm in a column direction.

According to an example embodiment, the first word line WL1 may be placed above the first to eighth ground selection lines GSL1 to GSL8. The first memory cells MC1 that are placed at the same height from the substrate may be connected with the first word line WL1. The m-th word line WLm may be placed below the string selection lines SSL1 to SSL8. The m-th memory cells MCm that are placed at the same height from the substrate may be connected with the m-th word line WLm. In a similar manner, the second to m-th memory cells MC2 to MCm that are placed at the same heights from the substrate may be respectively connected with the second to m-th word lines WL2 to WLm.

Figure 4:
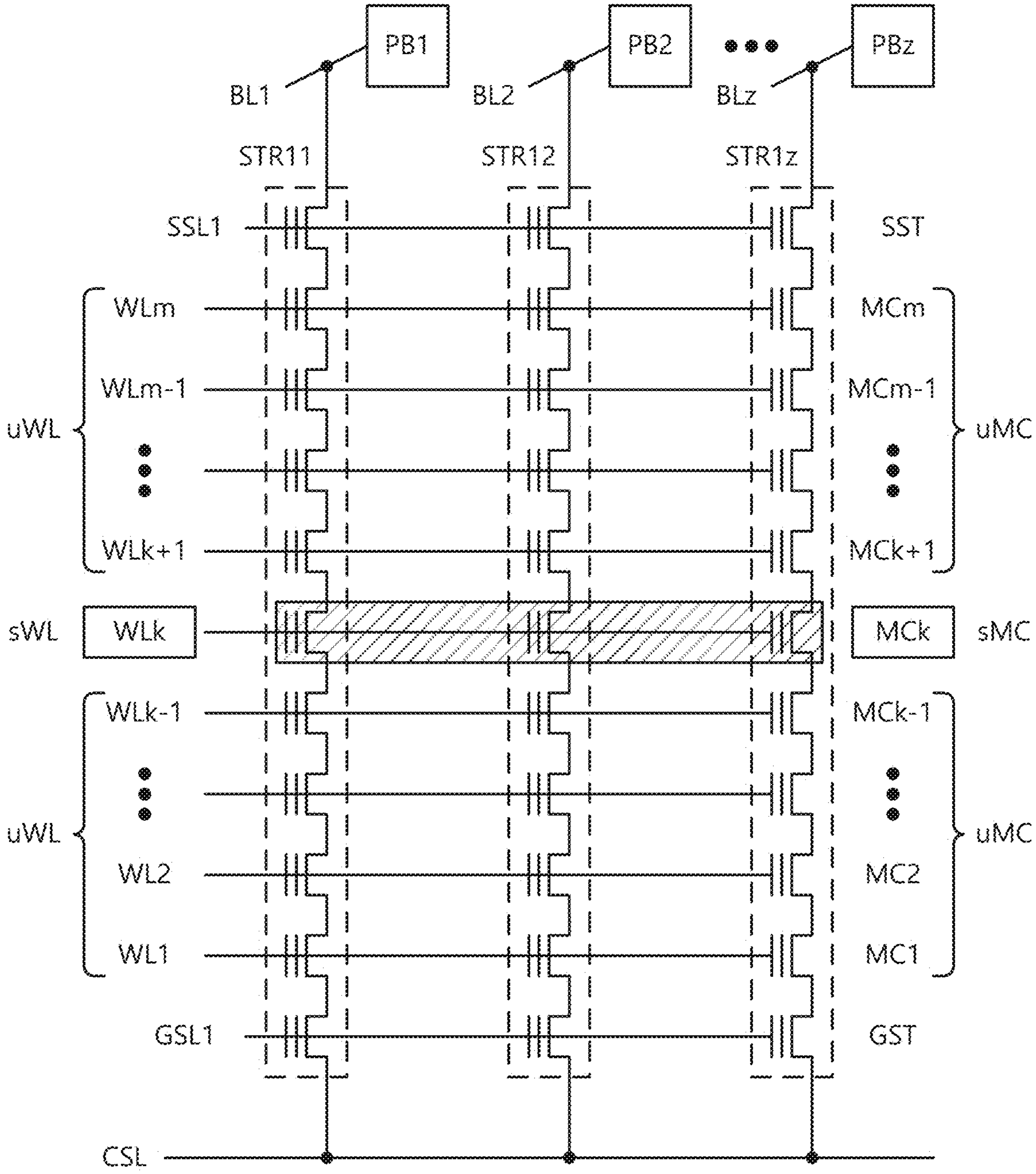
FIG. 4 is a circuit diagram illustrating cell strings selected by a first string selection line SSL1 among cell strings of a memory block BLK1 illustrated in FIG. 3.

FIG. 4 is a circuit diagram illustrating cell strings selected by a first string selection line SSL1 among cell strings of a memory block BLK1 illustrated in FIG. 3. One-one to one-z cell strings STR11 to STR1*z* may be selected by the first string selection line SSL1. The one-one to one-z cell strings STR11 to STR1*z* may be connected to first to z-th bit lines BL1 to BLz, respectively. First to z-th page buffers PB1 to PBz may be connected to the first to z-th bit lines BL1 to BLz, respectively.

According to an example embodiment, the one-one cell string STR11 may be connected to the first bit line BL1 and the common source line CSL. The one-one cell string STR11 may include string selection transistors SST selected by the first string selection line SSL1, first to m-th memory cells MC1 to MCm connected to first to m-th word lines WL1 to WLm, and ground selection transistors GST selected by first ground selection line GSL1. The one-two cell string STR12 may be connected to the second bit line BL2 and the common source line CSL. The one-z cell string STR1*z* may be connected to the z-th bit line BLz and the common source line CSL.

According to an example embodiment, the first word line WL1 and the m-th word line WLm may be edge word lines edge WL. The second word line WL2 and the m−1 word line WLm−1 may be edge adjacent word lines edge adjacent WL. The k-th word line WLk may be a selection word line sWL. The k−1 word line WLk−1 and the k+1 word line WLk+1 may be adjacent word lines located next to the selected word line. When the k-th word line WLk is a selected word line sWL, the remaining word lines WL1 to WLk−1 and WLk+1 to WLm may be unselected word lines uWL.

According to an example embodiment, the first memory cells MC1 and the m-th memory cells MCm may be edge memory cells. The second memory cells MC2 and the m−1 memory cells MCm−1 may be edge adjacent memory cells. The k-th memory cells MCk may be selection memory cells sMC. The k−1 memory cells MCk−1 and the k+1 memory cells MCk+1 may be memory cells adjacent to the selected memory cells (hereinafter referred to as adjacent memory cells (adjacent MC)). When the k-th memory cells MCk are selected memory cells sMC, the remaining memory cells MC1 to MCk−1 and MCk+1 to MCm may be unselected memory cells uMC.

According to an example embodiment, a set of memory cells selected by one string selection line and connected to one word line may be one page. For example, memory cells selected by the first string selection line SSL1 and connected to the k-th word line WLk may constitute one page. For example, eight pages may be configured in the k-th word line WLk. Among the eight pages, a page connected to the first string selection line SSL1 may be a selected page, and the other pages connected to the second to eighth string selection lines SSL2 to SSL8 may be unselected pages.

Figure 5:
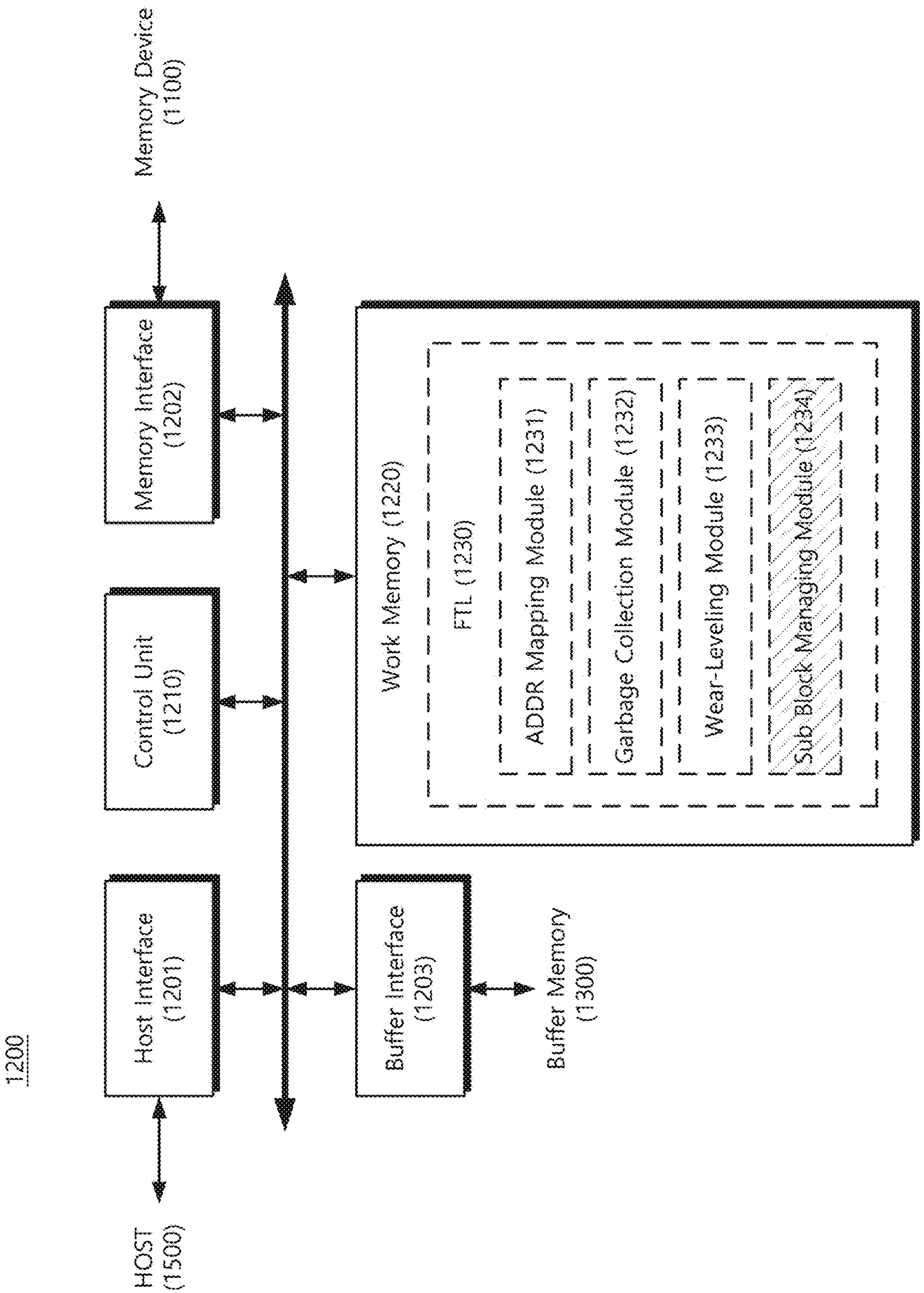
FIG. 5 is a block diagram illustrating a memory controller of FIG. 1 according to an example embodiment.

FIG. 5 is a block diagram illustrating a memory controller of FIG. 1 according to an example embodiment. Referring to FIG. 5, the memory controller 1200 may include a host interface 1201, a memory interface 1202, a buffer interface 1203, a control unit 1210 (or a controller 1210) and/or a work memory 1220.

In some embodiments, the memory controller 1200 may further include various other components. For example, the memory controller 1200 may further include an error correction code (ECC) circuit, a command generation module, or the like. The ECC circuit may generate an ECC to correct failure bits or error bits of data received from the memory device 1100. The command generation module may generate a command CMD for controlling memory operations according to a request from the host 1500.

According to an example embodiment, the host interface 1201 may provide an interface between the host 1500 and the memory controller 1200. Standard interfaces include various interface methods such as an advanced technology attachment (ATA), a serial ATA (SATA), an external SATA (e-SATA), a small computer small interface (SCSI), a serial attached SCSI (SAS), a peripheral component interconnection (PCI), a PCI express (PCI-E), an IEEE 1394, an universal serial bus (USB), a secure digital (SD) card, a multimedia card (MMC), an embedded multimedia card (eMMC), UFS, a compact flash (CF) card interface, or the like.

According to an example embodiment, the memory interface 1202 may provide an interface between the memory device 1100 and the memory controller 1200. For example, write or read data may be transmitted to and received from the memory device 1100 through the memory interface 1202. The memory interface 1202 may provide commands and addresses to the memory device 1100. Additionally, the memory interface 1202 may provide data read from the memory device 1100 to the memory controller 1200.

According to an example embodiment, the buffer interface 1203 may provide an interface between the buffer memory 1300 and the memory controller 1200. For example, data temporarily stored in the buffer memory 1300 may be transmitted to and received from the buffer memory 1300 through the buffer interface 1203.

According to an example embodiment, the control unit 1210 may include (at least one of) a central processing unit, a microprocessor, or the like, and may control the overall operation of the memory controller 1200. The control unit 1210 may drive firmware loaded in the work memory 1220 to control the memory controller 1200.

According to an example embodiment, the work memory 1220 may be implemented with various memories, for example, at least one of a cache memory, a DRAM, a SRAM, a PRAM and/or a flash memory. The work memory 1220 may drive a flash transition layer (FTL) 1230 under the control of the control unit 1210.

According to an example embodiment, the FTL 1230 may be firmware or a program for efficiently managing the memory device 1100. Unlike a hard disk, the memory device 1100 does not support an overwrite function. Therefore, to modify data written on a page, it is necessary to copy all valid data (or valid pages) in a previous block to which the page belongs to another empty block and delete the previous block. This process may perform multiple page copy (read and write pages) and erase operations.

According to an example embodiment, the FTL 1230 is used between the host 1500 and the memory device 1100 to reduce the number of page copy and erase operations. The FTL 1230 may include an address mapping module 1231 (or an address mapper 1231), a garbage collection module 1232 (or a garbage collector 1232) and/or a wear-leveling module 1233 (or a wear-leveler 1233).

According to an example embodiment, the address mapping module 1231 may perform an address mapping operation on a page-by-page or block-by-block basis. The page address mapping operation is an operation which converts a logical page address received from the file system into a physical page address within the memory device 1100. For this purpose, a page-level address mapping table must be maintained in the work memory 1220. The page address mapping operation may provide excellent garbage collection performance but require a large address mapping table.

According to an example embodiment, the garbage collection module 1232 may perform a garbage collection operation by referring to the address mapping table. For example, to secure one or more free blocks, the garbage collection module 1232 may use an address mapping table, record one or more valid data stored in a source block to a random block, and secure a free block by erasing the source block in which all the valid data have been moved.

According to an example embodiment, the wear-leveling module 1233 may manage wear-level of memory cells of the memory device 1100. Memory cells may be deteriorated by write and erase operations, etc. Deteriorated memory cells may cause defects. The wear-leveling module 1233 may manage program and erase cycles for the memory cell array 2000 to prevent specific cell areas from wearing out faster than other cell areas. The wear-leveling module 1233 may control the address mapping module 1231 such that program and erase times may be equally assigned to cell areas of the memory cell array 2000.

According to an example embodiment, the FTL 1230 may include a sub-block managing module 1234. For example, the sub-block managing module 1234 may manage a plurality of memory blocks included in the memory cell array 2000 as a plurality of sub-blocks. The sub-block managing module 1234 may match the plurality of memory blocks to each of the plurality of sub-blocks. The sub-block managing module 1234 may manage an address mapping table corresponding to the plurality of sub-blocks.

The sub-block management module 1234 may manage sub-blocks. The sub-block management module 1234 may access each of the sub-blocks. The sub-block management module 1234 may perform an input/output operation (IO command) and erase for each of the sub-blocks. The sub-block management module 1234 may manage an erase count of each of the sub-blocks.

Since a capacity of a sub-block is smaller than that of a memory block, the sub-block management module 1234 may quickly and efficiently manage data of the sub-block. The sub-block may operate efficiently in environments where data changes frequently or many random write requests are received.

Figure 6:
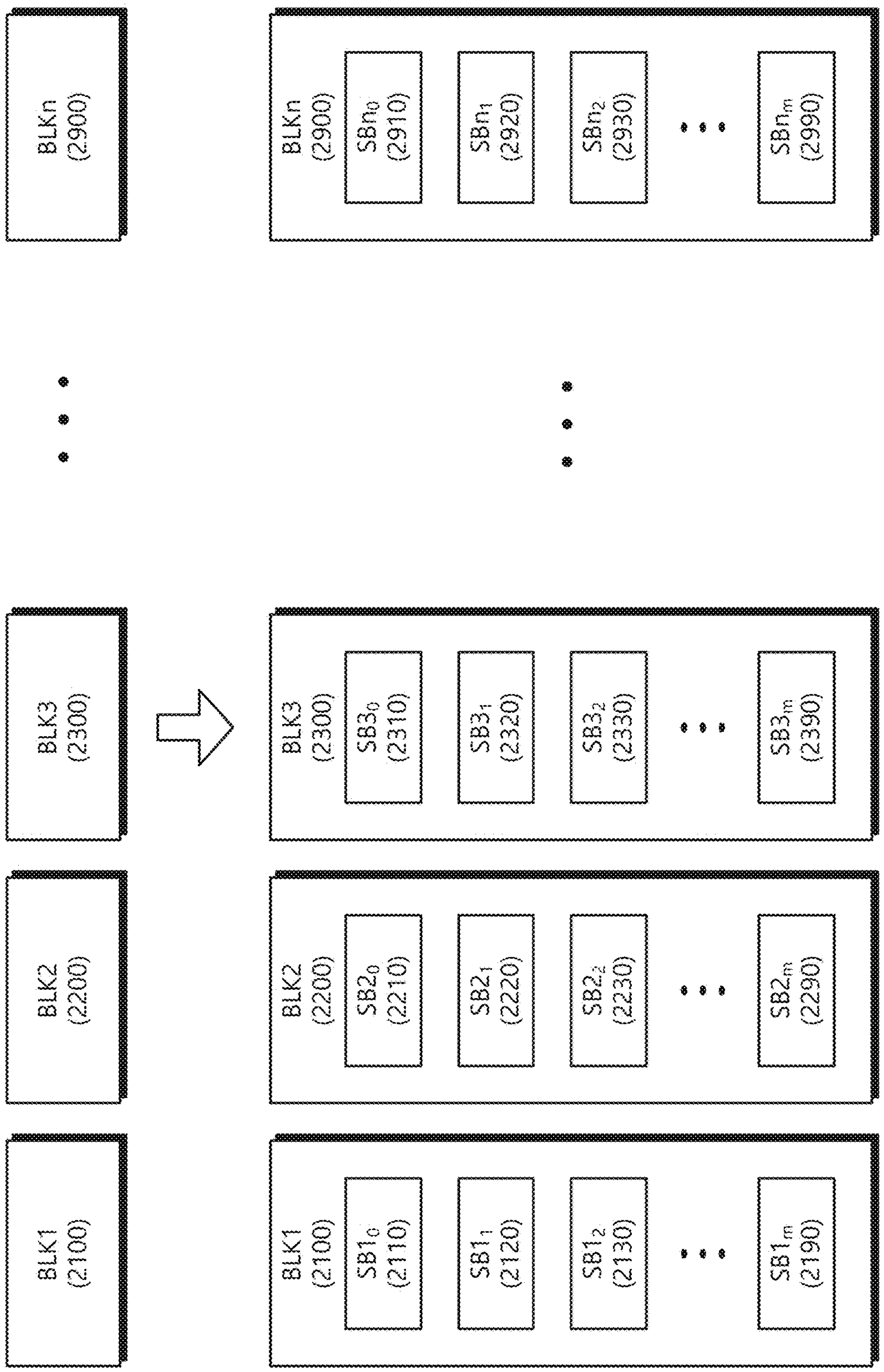
FIG. 6 is a diagram illustrating a relationship between a memory block and a sub-block illustrated in FIG. 2.

FIG. 6 is a diagram illustrating a relationship between a memory block and a sub-block illustrated in FIG. 2.

Referring to FIG. 6, memory blocks 2100 to 2900 may include at least one or more sub-blocks 2110 to 2990. The sub-blocks 2110 to 2990 included in the memory blocks 2100 to 2900 may be physically separated. As an example, the memory blocks 2100 to 2900 or the sub-blocks 2110 to 2990 may be used in units of data management for normal I/O operations such as a search operation, a read operation or a write operation. Additionally, the memory blocks 2100 to 2900 or the sub-blocks 2110 to 2990 may be used as the minimum unit on which an erase operation may be performed.

Each of the memory blocks 2100 to 2900 may include the plurality of sub-blocks 2110 to 2990, for example, as shown in FIG. 6. As an example, the plurality of sub-blocks 2110 to 2990 may have different sizes due to characteristics of physical structure. As another example, the plurality of sub-blocks 2110 to 2990 may be set to have different sizes through a dynamic allocation process. However, this is an example, and depending on example embodiments, the plurality of sub-blocks 2110 to 2990 may be implemented to have the same size.

One of the memory blocks 2100 to 2900 may include a portion of the plurality of sub-blocks 2110 to 2990. As an example, the first memory block 2100 may include a first sub-block 2110, a second sub-block 2120, a third sub-block 2130 to an n-th sub-block 2190.

Figure 7:
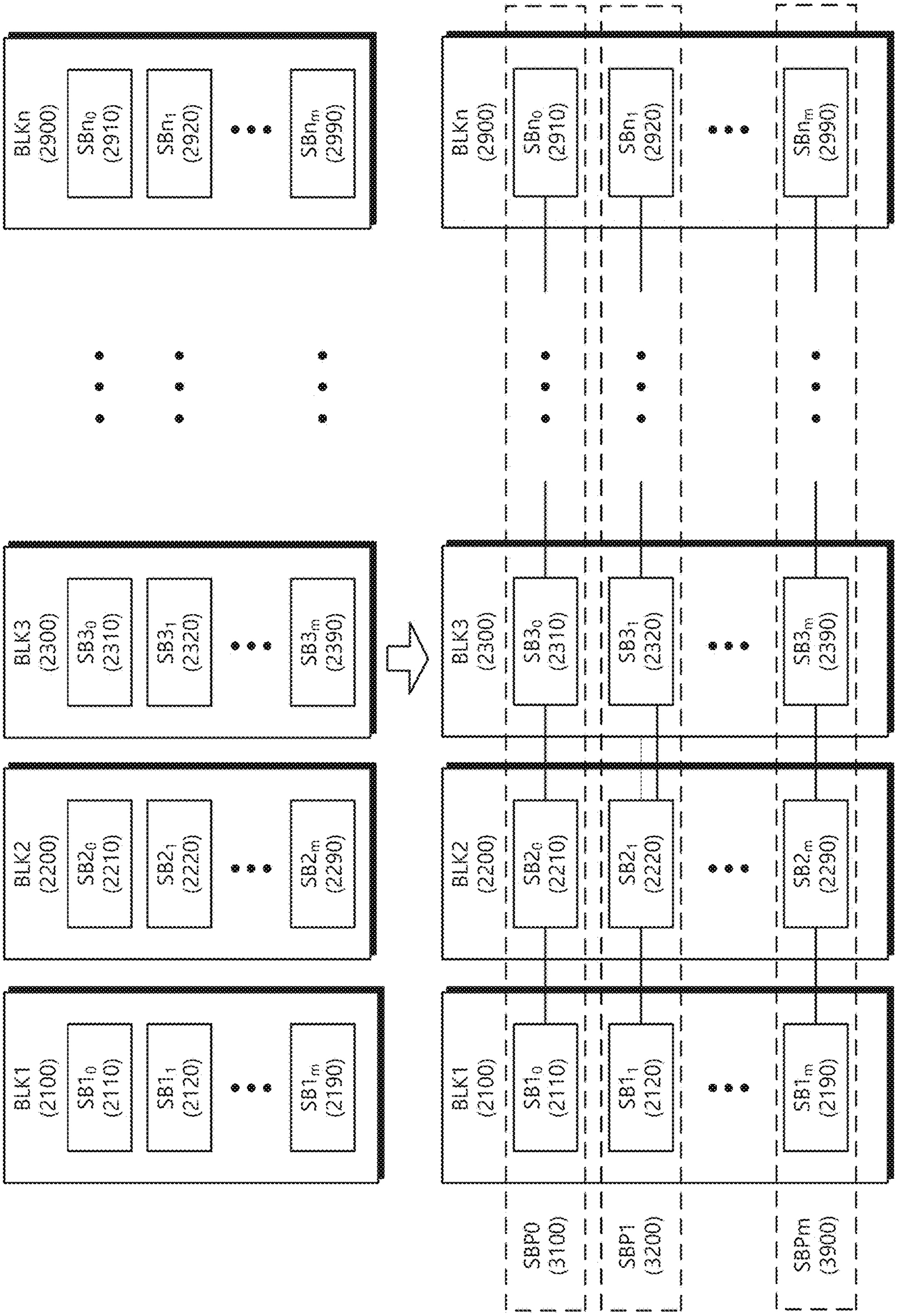
FIG. 7 is a diagram illustrating an example embodiment of a process configuring a sub-block pool by using sub-blocks.

FIG. 7 is a diagram illustrating an example embodiment of a process configuring a sub-block pool by using sub-blocks.

Referring to FIGS. 5 and 7, the sub-block management module 1234 may classify the sub-blocks 2110 to 2990 according to predetermined criteria (or based on predetermined criteria). As an example, the predetermined criterion may include capacity or an erase count of the sub-blocks 2110 to 2990.

The sub-block management module 1234 may add the classified sub-blocks 2110 to 2990 to sub-block pools 3100 to 3900. Hereinafter, for explanation purposes, it is assumed that one memory block includes three sub-blocks.

Figure 8:
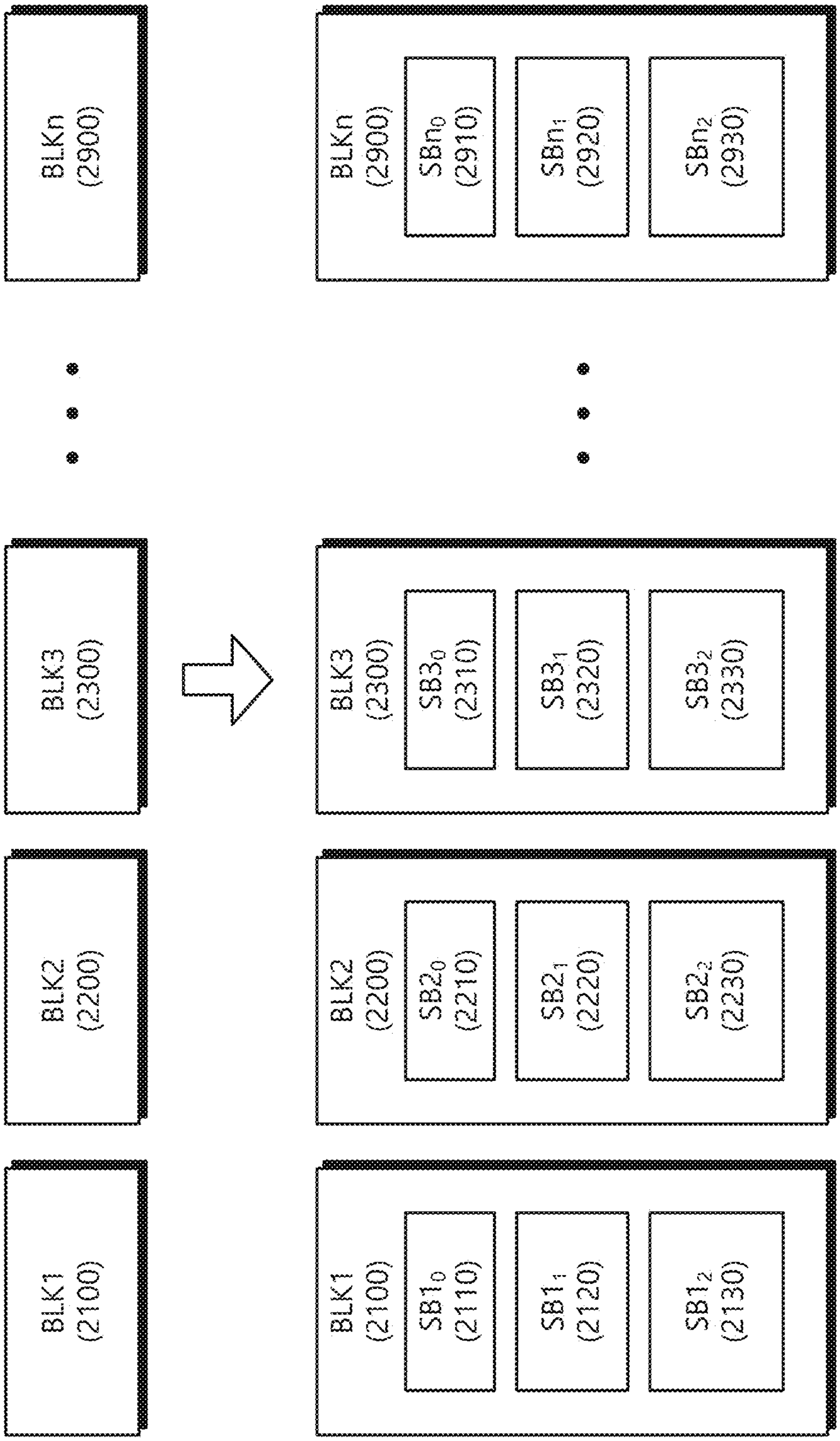
FIG. 8 is a diagram illustrating an example embodiment where a memory block illustrated in FIG. 6 includes three sub-blocks.

FIG. 8 is a diagram illustrating an example embodiment where a memory block illustrated in FIG. 6 includes three sub-blocks.

Referring to FIG. 8, one of memory blocks 2100 to 2900 may include three sub-blocks among sub-blocks 2110 to 2930. The memory blocks 2100 to 2900 include first sub-blocks 2110, 2210, 2310 to 2910, second sub-blocks 2120, 2220, 2320 to 2920, and third sub-blocks 2130, 2230, 2330 to 2930. As an example, the first sub-blocks 2110, 2210, 2310 to 2910, the second sub-blocks 2120, 2220, 2320 to 2920, and the third sub-blocks 2130, 2230, 2330 to 2930 may have different capacities each other.

As an example, in the memory blocks 2100 to 2900, the first sub-blocks 2110, 2210, and 2310 to 2910 may have the smallest capacity. The third sub-blocks 2130, 2230, 2330 to 2930 may have the largest capacity. The second sub-blocks 2120, 2220, 2320 to 2920 may have a capacity between the smallest capacity and the largest capacity.

The total capacity of the sub-blocks 2110 to 2930 may be determined within a capacity range of the memory blocks 2100 to 2900. As an example, when a capacity of the first memory block 2100 is 10 MB, the sum of capacities of the first sub-block 2110, the second sub-block 2120 and the third sub-block 2130 may be in the range of 10 MB.

Figure 9:
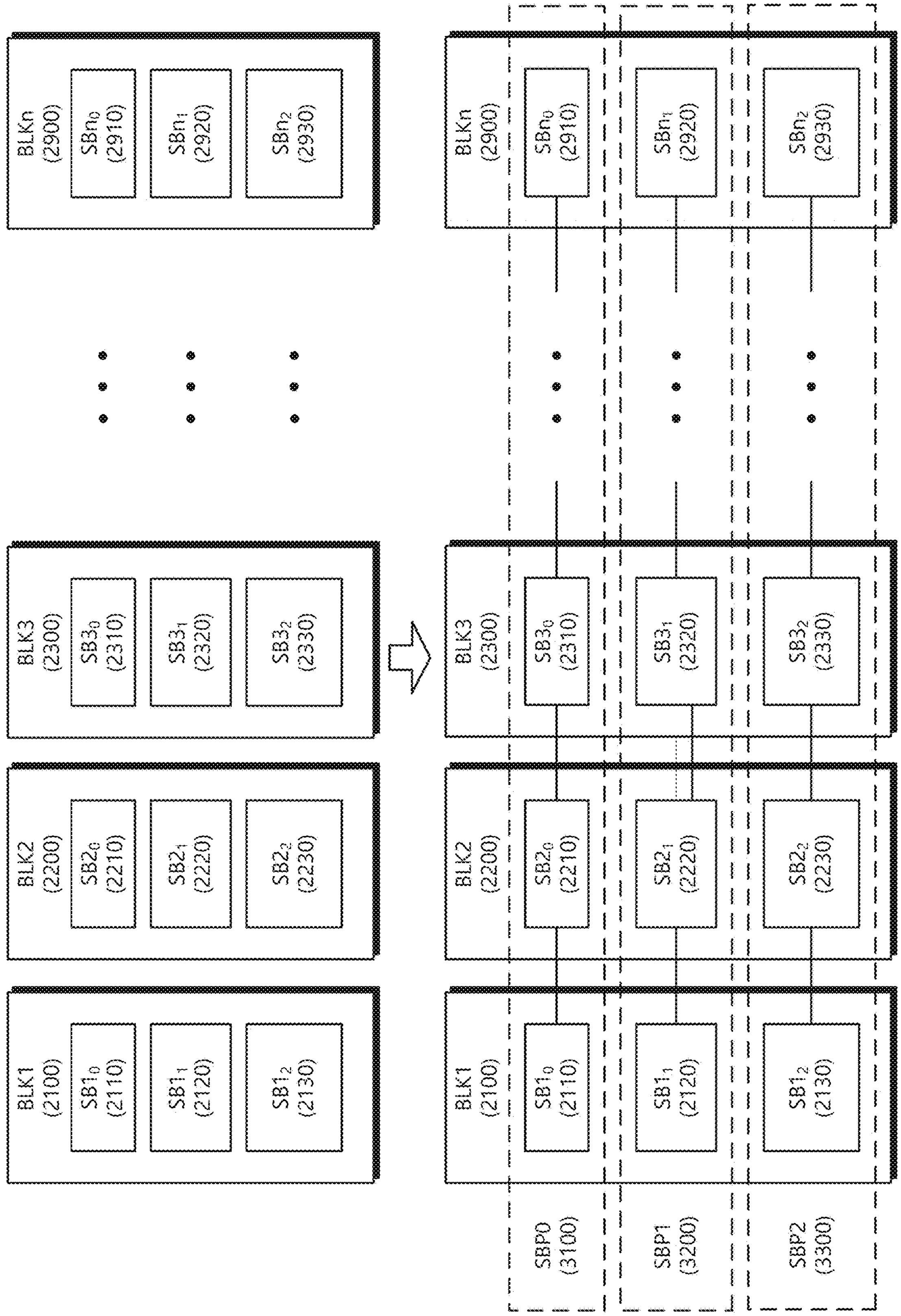
FIG. 9 is a diagram illustrating another example embodiment of a process configuring a sub-block pool by using sub-blocks.

FIG. 9 is a diagram illustrating another example embodiment of a process configuring a sub-block pool by using sub-blocks.

Referring to FIGS. 5 and 9, the sub-block management module 1234 may classify the sub-blocks 2110 to 2930 according to predetermined criteria (or based on predetermined criteria). As an example, the predetermined criterion may include the capacity of each of the sub-blocks 2110 to 2930.

The sub-blocks 2110 to 2930 may be divided into first sub-blocks 2110, 2210, 2310 and 2910, second sub-blocks 2120, 2220, 2320 and 2920, and third sub-blocks 2130, 22130, 2330 and 2930 depending on capacity. As an example, a capacity of each of the first sub-blocks 2110, 2210, 2310 and 2910 may be the smallest. A capacity of each of the third sub-blocks 2130, 22130, 2330 and 2930 may be the largest. A capacity of each of the second sub-blocks 2120, 2220, 2320 and 2920 may be between the smallest and the largest.

The sub-block management module 1234 may classify the sub-blocks 2110 to 2930 according to the capacity (or based on the capacity) and add the sub-blocks 2110 to 2930 to sub-block pools 3100, 3200 and 3300. The sub-block management module 1234 may manage the sub-blocks 2110 to 2930 added to the sub-block pools 3100, 3200 and 3300.

The first sub-blocks 2110, 2210, 2310 to 2910 may be included in the first sub-block pool 3100 by the sub-block management module 1234. In the same way, the second sub-blocks 2120, 2220, 2320 to 2920 may be included in the second sub-block pool 3200, and the third sub-blocks 2130, 2230, 2330, to 2930 may be included in the third sub-block pool 3300. Accordingly, one of the sub-block pools 3100, 3200 and 3300 may include sub-blocks of the same capacity among the sub-blocks 2110 to 2930.

Figure 10:
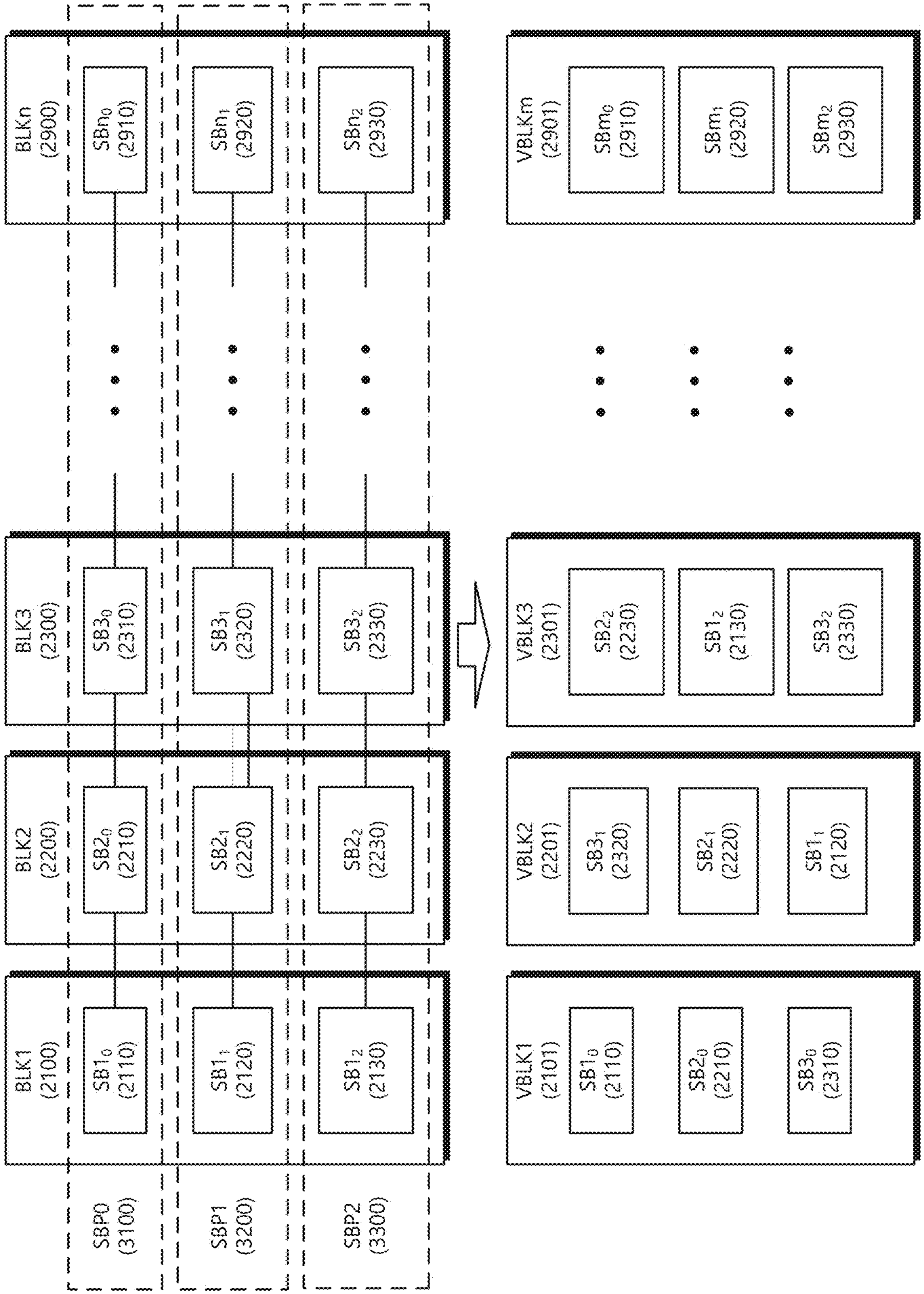
FIG. 10 is a diagram illustrating an example embodiment of a process configuring a virtual memory block by using a sub-block pool.

FIG. 10 is a diagram illustrating an example embodiment of a process configuring a virtual memory block by using a sub-block pool.

Referring to FIGS. 5 and 10, the sub-block management module 1234 may use the sub-blocks 2110 to 2930 included in the sub-block pools 3100, 3200 and 3300 to configure virtual memory blocks 2101, 2201 to 2901.

The sub-block management module 1234 may select one or more sub-blocks among the sub-blocks 2110 to 2930 from one of the sub-block pools 3100, 3200 and 3300. As an example, the sub-block management module 1234 may sequentially select the sub-blocks 2110, 2210, 2310 to 2930 from the first sub-block pool 3100. As another example, the sub-block management module 1234 may randomly select the sub-blocks 2110, 2210, 2310 to 2930 from the first sub-block pool 3100. The sub-block management module 1234 may add the selected sub-blocks 2110 to 2930 to the virtual memory blocks 2101, 2201 to 2901.

The sub-block management module 1234 may configure the first to m-th virtual memory blocks 2101 to 2901 with the sub-blocks 2110 to 2930 selected from the first to third sub-block pools 3100 to 3300. Since the sub-block management module 1234 selects sub-blocks from the same sub-block pool, one virtual memory block may include sub-blocks of the same size.

As an example, the sub-block management module 1234 may select three sub-blocks 2110, 2210 and 2310 from the first sub-block pool 3100. The sub-block management module 1234 may add the three selected sub-blocks 2110, 2210 and 2310 to the first virtual memory block 2101. Since a capacity of the first sub-blocks 2110, 2210 and 2310 is the smallest in each of the memory blocks 2100, 2200 and 2300, a capacity of the first virtual memory block 3100 is the smallest.

As an example, the sub-block management module 1234 may select three sub-blocks 2130, 2230 and 2330 from the third sub-block pool 3300. The sub-block management module 1234 may add the three selected sub-blocks 2130, 2230 and 2330 to the third virtual memory block 2301. Since a capacity of the third sub-blocks 2130, 2230 and 2330 are the largest in each of the memory blocks 2100, 2200 and 2300, a capacity of the third virtual memory block 3300 is the largest.

Figure 11:
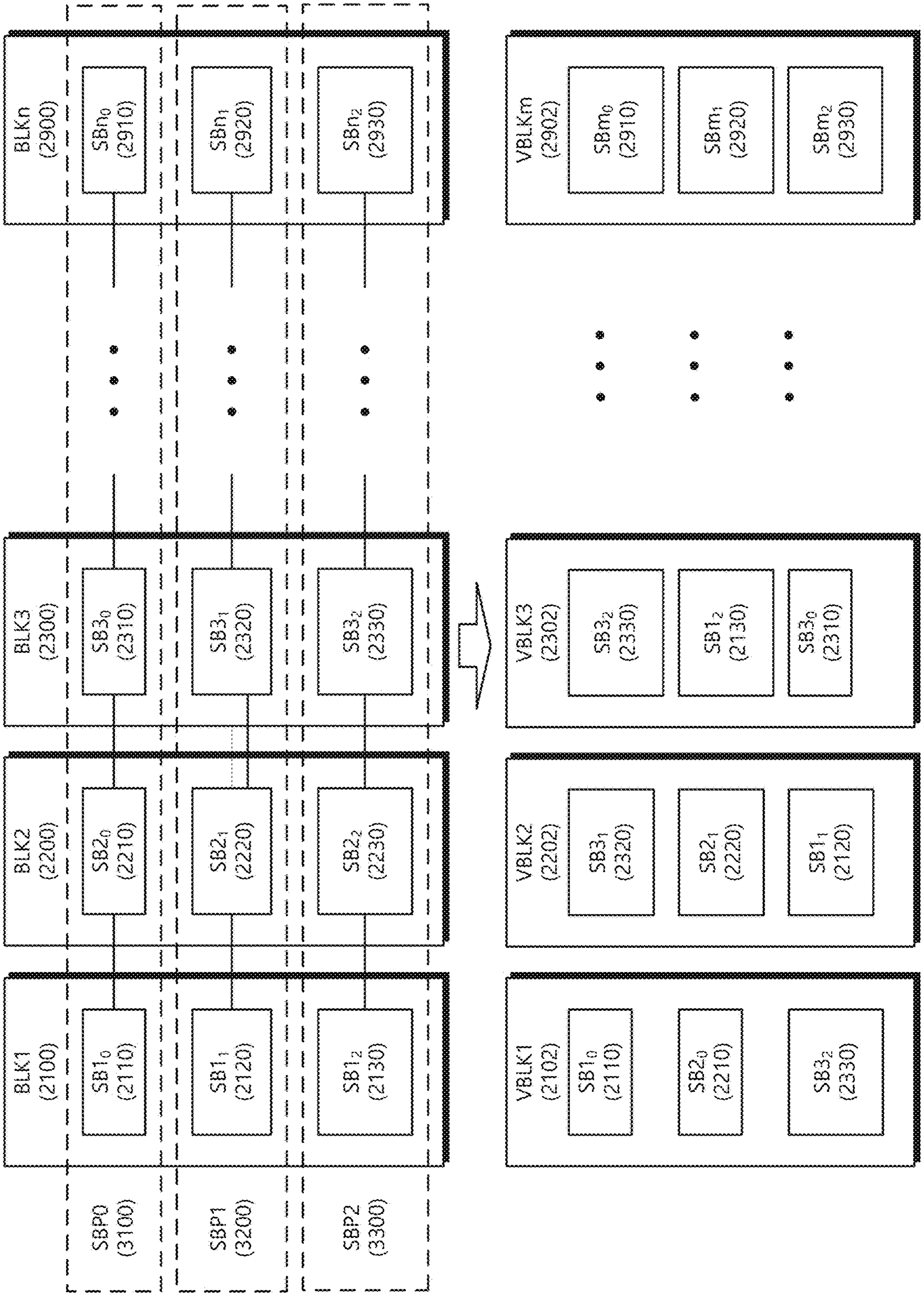
FIG. 11 is a diagram illustrating an example embodiment of a process configuring a virtual memory block in another manner by using a sub-block pool.

FIG. 11 is a diagram illustrating an example embodiment of a process configuring a virtual memory block in another manner by using a sub-block pool.

Referring to FIGS. 5 and 11, the sub-block management module 1234 may be configured to use the sub-blocks 2110 to 2930 included in the sub-block pools 3100, 3200 and 3300 to configure virtual memory blocks 2102, 2202 and 2902 in different ways from FIG. 10.

The sub-block management module 1234 may select one or more sub-blocks 2110 to 2930 from one or more sub-block pools 3100, 3200 and 3300. As an example, the sub-block management module 1234 may sequentially select sub-blocks among the sub-blocks 2110 to 2930 from the sub-block pools 3100, 3200 and 3300. As another example, the sub-block management module 1234 may randomly select sub-blocks among the sub-blocks 2110 to 2930 from the sub-block pools 3100, 3200 and 3300. The sub-block management module 1234 may add the selected sub-blocks 2110 to 2930 to the virtual memory blocks 2102, 2202 to 2902.

The sub-block management module 1234 may configure the first to m-th virtual memory blocks 2102 to 2902 with the sub-blocks 2110 to 2930 selected from the first to third sub-block pools 3100 to 3300. Since the sub-block management module 1234 selects the sub-blocks 2110 to 2930 from one or more sub-block pools 3100, 3200 and 3300, one virtual memory block may include sub-blocks of different sizes. Accordingly, the sub-block management module 1234 may configure virtual memory blocks VBLK with various capacities. The virtual memory blocks VBLK with various capacities may improve memory usage efficiency in various ways.

As an example, the sub-block management module 1234 may select two sub-blocks 2110 and 2210 from the first sub-block pool 3100, and one sub-block 2330 from the third sub-block pool 3300. The sub-block management module 1234 may add the three selected sub-blocks 2110, 2210 and 2330 to the first virtual memory block 2102.

As an example, the sub-block management module 1234 may select one sub-block 2130 from the first sub-block pool 3100, and two sub-blocks 2310 and 2330 from the third sub-block pool 3300. The sub-block management module 1234 may add the three selected sub-blocks 2130, 2310 and 2330 to the third virtual memory block 2302.

Figure 12:
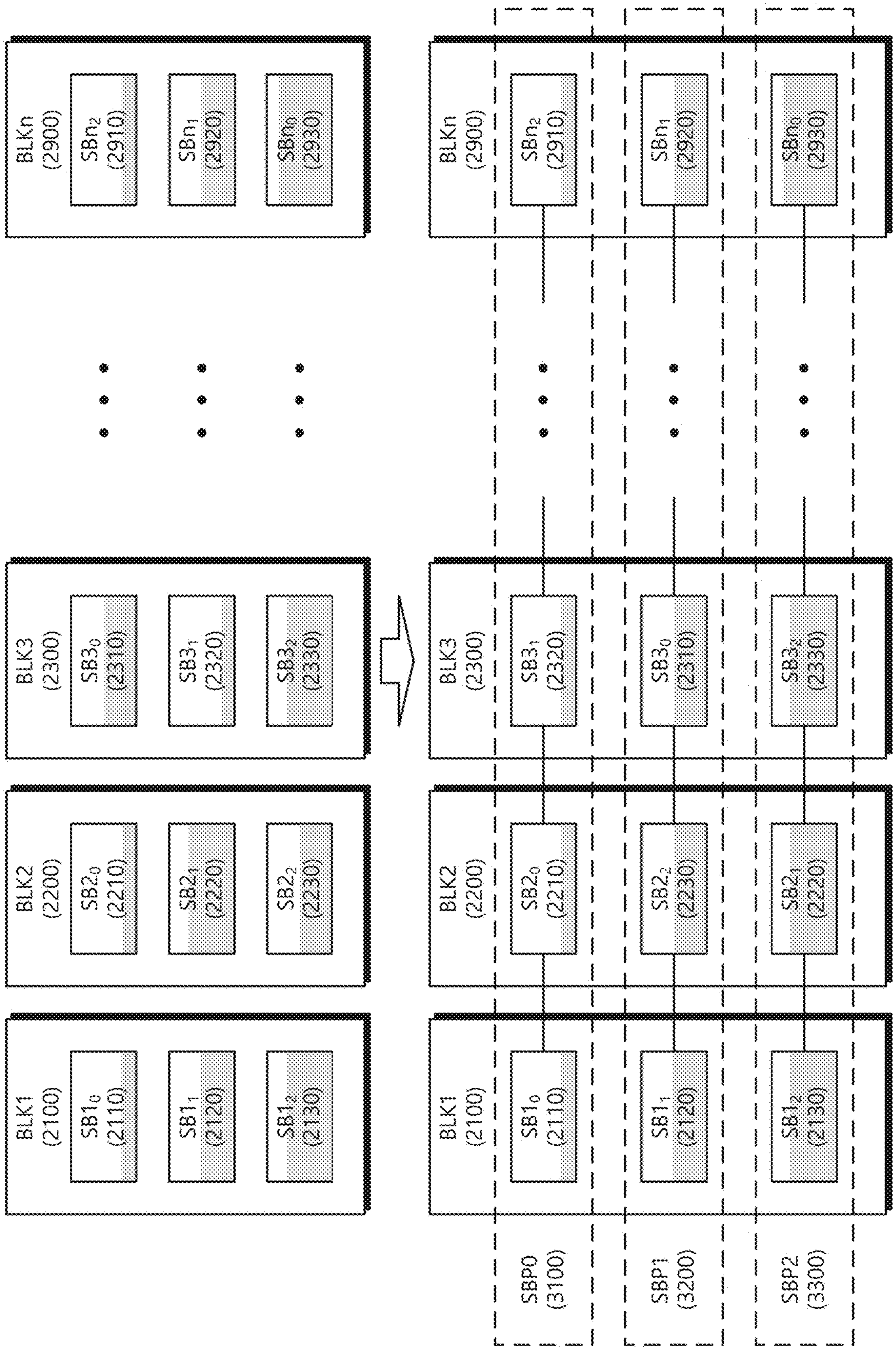
FIG. 12 is a diagram illustrating an example embodiment of a process configuring a sub-block pool from sub-blocks based on the erase count.

FIG. 12 is a diagram illustrating an example embodiment of a process configuring a sub-block pool from sub-blocks based on the erase count.

Referring to FIGS. 5 and 12, the sub-block management module 1234 may classify sub-blocks 2110 to 2930 according to predetermined criteria (or based on predetermined criteria). As an example, the predetermined criteria may be determined based on an erase count of each of the sub-blocks 2110 to 2930.

In FIG. 12, a size of the block representing the sub-blocks 2110 to 2930 may be not related to the actual capacity of the sub-blocks 2110 to 2930, and shading may represent an erase count of one sub-block. As an example, an erase count of the first sub-block 2110 of the first memory block 2100 may indicate that about ¼ of an allowable range has been used. Additionally, an erase count of the third sub-block 2130 of the first memory block 2100 may indicate that about ¾ of an allowable range has been used.

The sub-block management module 1234 may add the classified sub-blocks 2110 to 2930 to the sub-block pools 3100, 3200 and 3300. The sub-block management module 1234 may manage the sub-blocks 2110 to 2930 added to the sub-block pools 3100, 3200 and 3300.

An erase operation may be performed in units of memory blocks 2100 to 2900. Additionally, the erase operation may be performed in units of sub-blocks 2110 to 2930. Accordingly, an erase count may be different for each memory block 2100 to 2900, and may be different for each sub-block 2110 to 2930 in the same memory block. However, an erase count of sub-blocks 2110 to 2930 within the same memory block have to be maintained within a predetermined range. As an example, the predetermined range may be set during manufacturing.

The sub-block management module 1234 may select the sub-blocks 2110, 2210 and 2320 with the fewest erase counts from the memory blocks 2100 to 2900. The sub-block management module 1234 may add the selected sub-blocks 2110, 2210 and 2320 to the first sub-block pool 3100.

In the same way, the sub-block management module 1234 may select the sub-blocks 2130, 2220 and 2330 with the highest erase counts from the memory blocks 2100 to 2900. The sub-block management module 1234 may add the selected sub-blocks 2130, 2220 and 2330 to the third sub-block pool 3300.

Finally, the sub-block management module 1234 may select the remaining sub-blocks 2120, 2230 and 2310 from the memory blocks 2100 to 2900. The sub-block management module 1234 may add the selected sub-blocks 2120, 2230 and 2310 to the second sub-block pool 3200.

Figure 13:
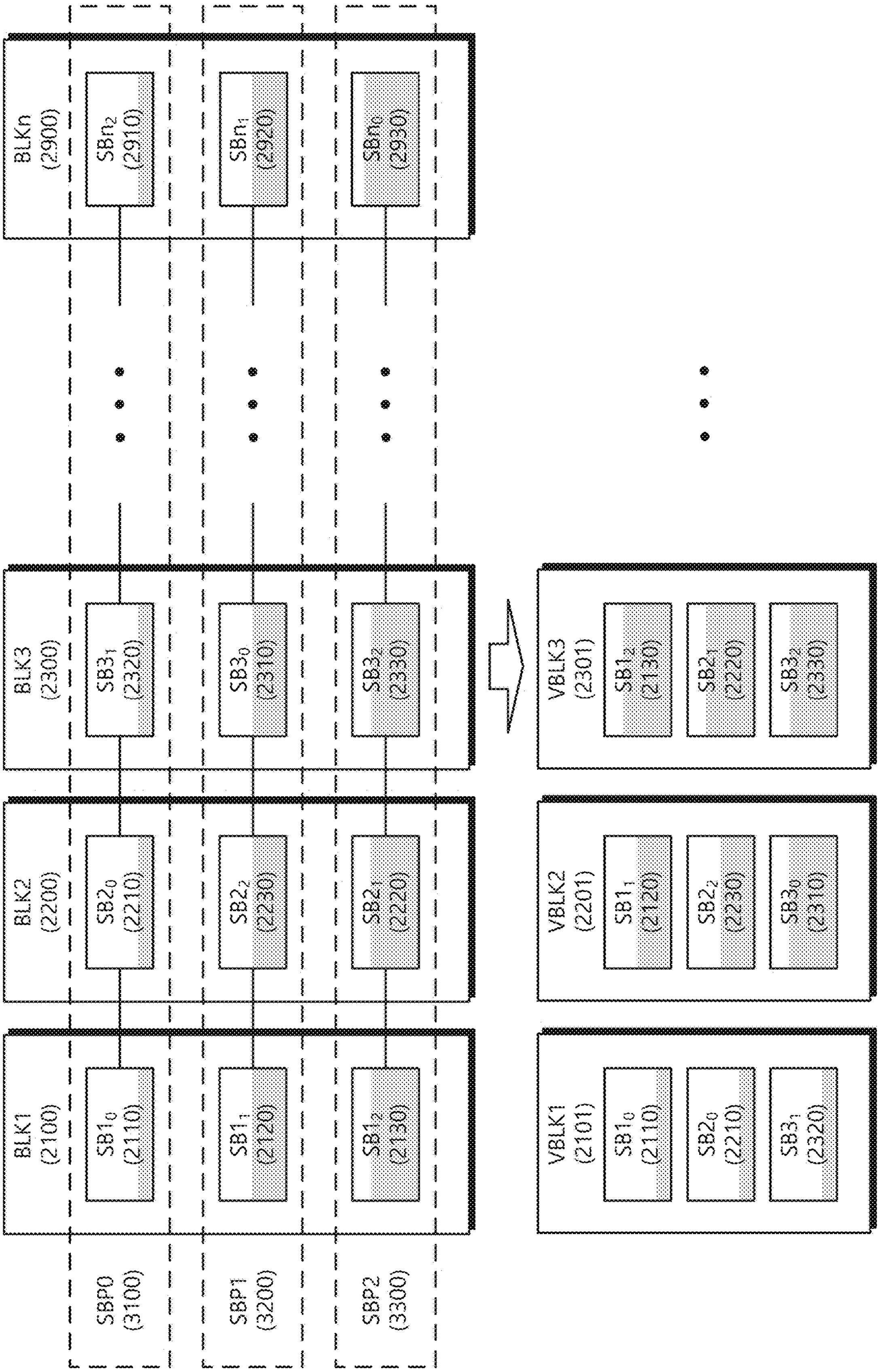
FIG. 13 is a diagram illustrating an example embodiment of a process configuring a virtual memory block from a sub-block pool based on the erase count.

FIG. 13 is a diagram illustrating an example embodiment of a process configuring a virtual memory block from a sub-block pool based on the erase count.

Referring to FIGS. 5 and 13, the sub-block management module 1234 may configure virtual memory blocks VBLK based on erase counts.

The sub-block management module 1234 may select one or more sub-blocks 2110 to 2930 from one sub-block pool 3100, 3200 and 3300. As an example, the sub-block management module 1234 may sequentially select sub-blocks 2110 to 2930 from the sub-block pools 3100, 3200 and 3300. As another example, the sub-block management module 1234 may randomly select sub-blocks 2110 to 2930 from the sub-block pools 3100, 3200 and 3300. The sub-block management module 1234 may add the selected sub-blocks 2110 to 2930 to the virtual memory blocks 2101, 2201 and 2301. Since the sub-block management module 1234 selects sub-blocks 2110 to 2930 from the same sub-block pool among the sub-block pools 3100, 3200 and 3300, one of the virtual memory blocks 2101, 2201, and 2301 may include sub-blocks with similar erase counts.

As an example, the sub-block management module 1234 may select three sub-blocks 2110, 2210 and 2320 from the first sub-block pool 3100. The sub-block management module 1234 may add the three selected sub-blocks 2110, 2210 and 2320 to the first virtual memory block 2101. Since erase counts of the third sub-blocks 2110, 2210 and 2320 are the smallest, an average erase count of the first virtual memory block 2101 is the lowest.

As an example, the sub-block management module 1234 may select three sub-blocks 2130, 2220 and 2330 from the third sub-block pool 3300. The sub-block management module 1234 may add the three selected sub-blocks 2130, 2220 and 2330 to the third virtual memory block 2301. Since erase counts of the third sub-blocks 2130, 2220 and 2330 are the largest, an average erase count of the third virtual memory block 2301 may also be the largest.

Figure 14:
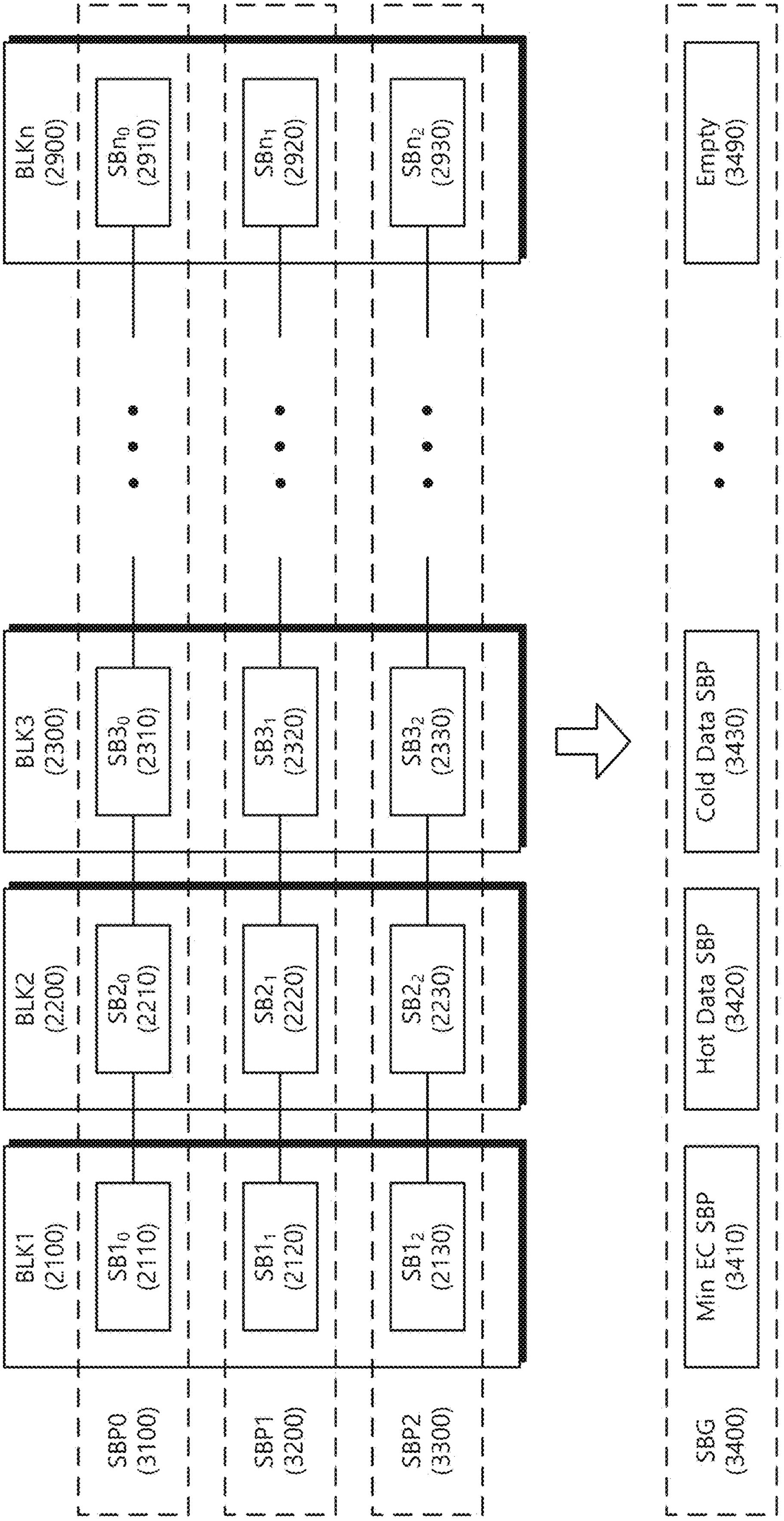
FIG. 14 is a diagram schematically illustrating an example embodiment of a process configuring a sub-block group from a sub-block pool.
Figure 15:
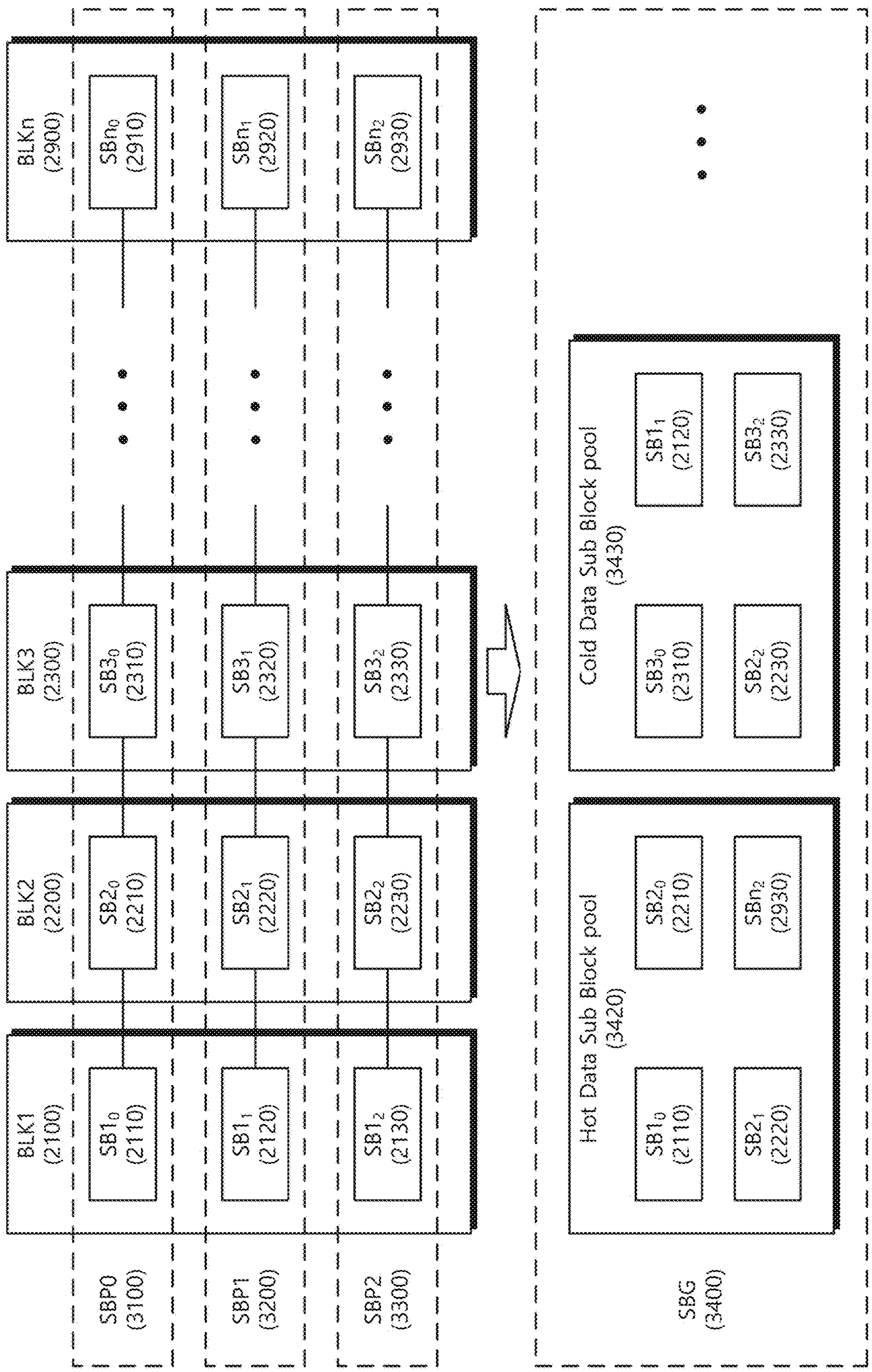
FIG. 15 is a diagram illustrating in detail an example embodiment of a process configuring a sub-block group from a sub-block pool.

FIG. 14 is a diagram schematically illustrating an example embodiment of a process configuring a sub-block group from a sub-block pool. FIG. 15 is a diagram illustrating in detail an example embodiment of a process configuring a sub-block group from a sub-block pool.

Referring to FIGS. 14 and 15, the sub-block management module 1234 may (be configured to) select sub-blocks 2110 to 2930 from the existing sub-block pools 3100, 3200 and

3300. The sub-block management module 1234 may add selected sub-blocks among the sub-blocks 2110 to 2930 to sub-block pools 3410, 3420, 3430 to 3490 of a sub-block group 3400.

The sub-block management module 1234 may form (or generate) the sub-block pools 3100, 3200 and 3300 based on a capacity of a sub-block or an erase count of a sub-block.

The sub-block management module 1234 may set the sub-block pools 3100, 3200 and 3300 according to predetermined criteria (or based on predetermined criteria). As an example, the predetermined criteria may include a workload such as a capacity, an erase count and/or frequency of access to data. The sub-block management module 1234 may include a minimum erase count sub-block pool 3410 which includes sub-blocks that satisfy a minimum erase count (hereinafter, a "Min EC").

The sub-block management module 1234 may include a hot data sub-block pool 3420 for hot data which has a small data size and is frequently accessed. In contrast, the sub-block management module 1234 may include a cold data sub-block pool 3430 for cold data that has a large data size and is infrequently accessed.

Furthermore, the sub-block management module 1234 may add a sub-block pool 3490 for various types based on various characteristics to the sub-block group 3400. The sub-block management module 1234 may manage the minimum erase count sub-block pool 3410, the hot data sub-block pool 3420, the cold data sub-block pool 3430 and/or the sub-block pool by type 3490.

The sub-block management module 1234 may manage sub-block pools classified into a sub-block group 3400. The sub-block management module 1234 may manage the sub-block group 3400 to respond to various purposes, various scenarios and/or various specifications.

Referring to FIG. 15, the sub-block management module 1234 may (be configured to) select sub-blocks 2110 to 2930 from the existing sub-block pools 3100, 3200 and 3300.

As an example, the sub-block management module 1234 may select sub-blocks 2110, 2210, 2220 and 2930 with small erase counts. Alternatively, the sub-block management module 1234 may select sub-blocks 2110, 2210, 2220 and 2930 with small capacities. The sub-block management module 1234 may add the selected sub-blocks 2110, 2210, 2220 and 2930 to the hot data sub-block pool 3420.

As an example, the sub-block management module 1234 may select sub-blocks 2310, 2120, 2230 and 2330 with large erase counts. Alternatively, the sub-block management module 1234 may select sub-blocks 2310, 2120, 2230 and 2330 with large capacities. The sub-block management module 1234 may add the selected sub-blocks 2310, 2120, 2230 and 2330 to the cold data sub-block pool 3430.

Figure 16:
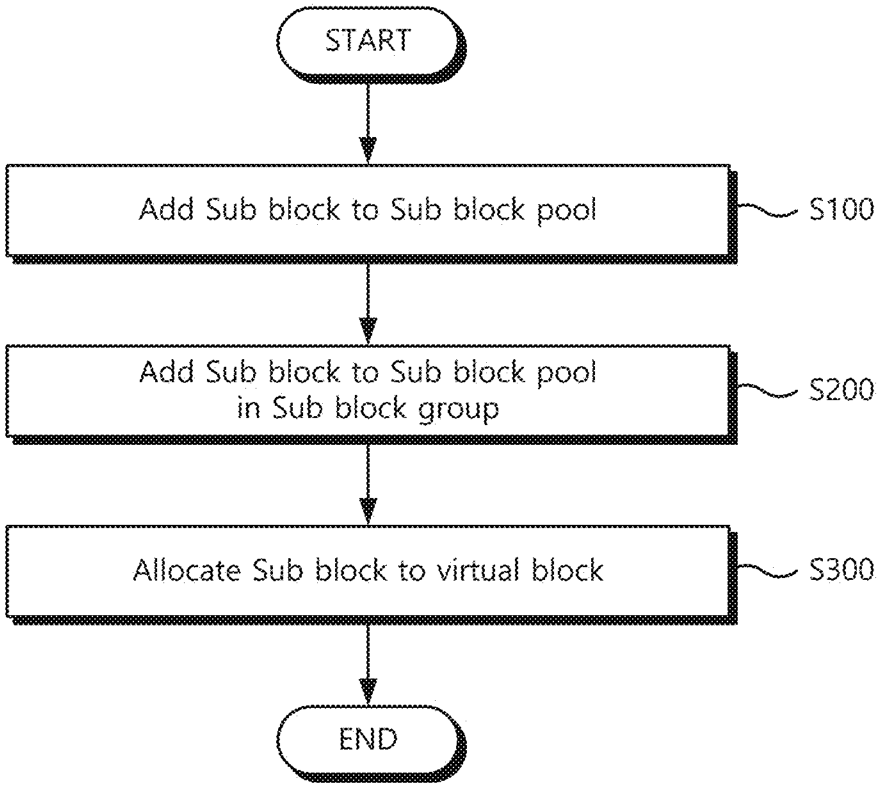
FIG. 16 is a flowchart illustrating an example embodiment of a formation process of a sub-block pool and a sub-block group.

FIG. 16 is a flowchart illustrating an example embodiment of a formation process of a sub-block pool and a sub-block group.

Referring to FIG. 16, the FTL 1230 may add a sub-block to a sub-block pool and/or a sub-block pool in a sub-block group.

In operation S100, the memory controller 1200 may add a sub-block to the first sub-block pool. The memory controller 1200 may classify sub-blocks based on properties of the sub-blocks. The memory controller 1200 may consider a capacity of each of the sub-blocks or an erase count of each of the sub-blocks as characteristics of each of the sub-blocks. The memory controller 1200 may add a classified sub-block to the first sub-block pool.

In operation S200, the memory controller 1200 may add a sub-block to the second sub-block pool in the sub-block group. The memory controller 1200 may select a sub-block from the first sub-block pool based on characteristics of the sub-block. As an example, characteristics of the sub-block may include a capacity, an erase count, a purpose of use, a scenario and/or a specification. The memory controller 1200 may add selected sub-block to the second sub-block pool.

In operation S300, the memory controller 1200 may allocate a sub-block added to the sub-block pool to a virtual memory block.

Figure 17:
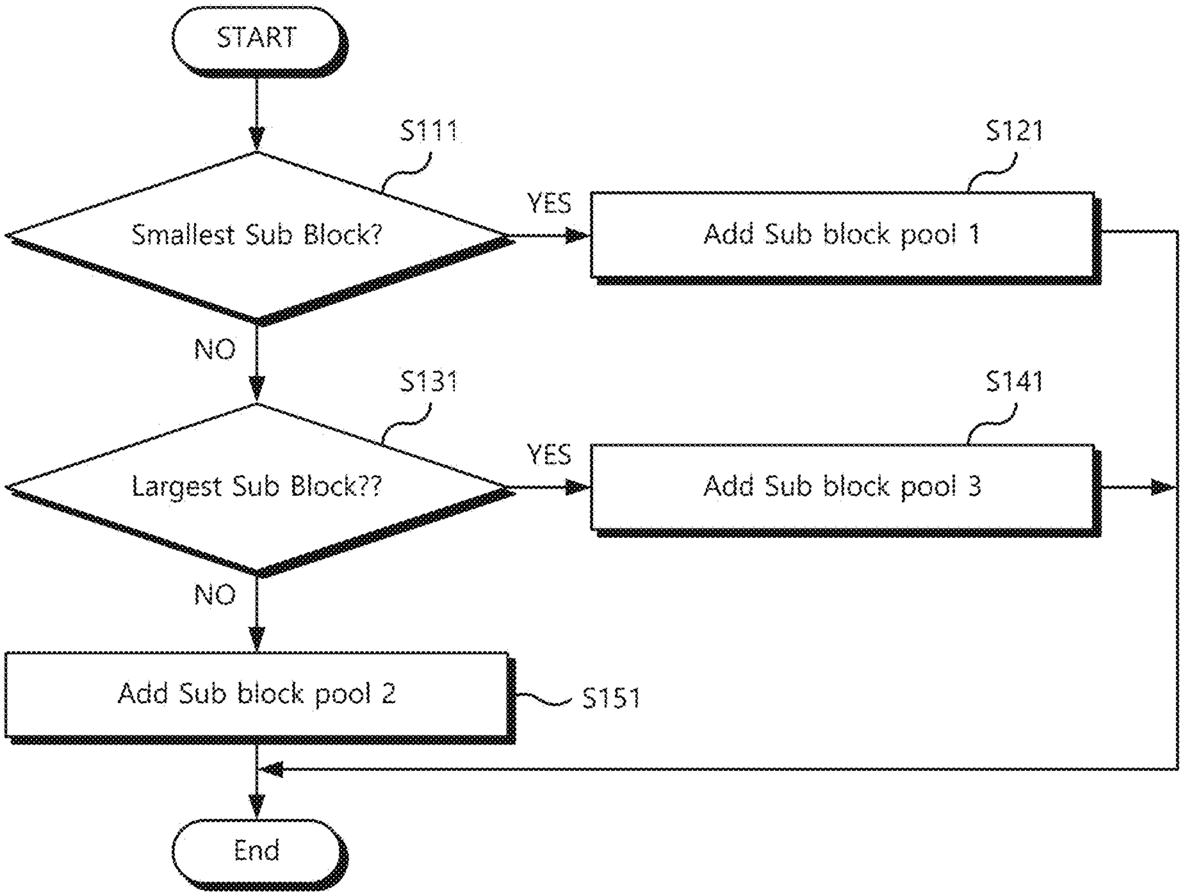
FIG. 17 is a flowchart illustrating an example embodiment of a basic formation process of a sub-block pool illustrated in FIG. 16.

FIG. 17 is a flowchart illustrating an example embodiment of a basic formation process of a sub-block pool illustrated in FIG. 16.

Referring to FIG. 17, the memory controller 1200 may add a sub-block to the first sub-block pool.

In operation S111, the memory controller 1200 may determine whether a capacity of the sub-block is the smallest among a memory block. When the memory controller 1200 determines that the sub-block is the smallest (YES), the memory controller 1200 may add the sub-block to the first sub-block pool (Sub block pool 1) (S121). When the memory controller 1200 determines that the sub-block is not the smallest (NO), the memory controller 1200 may determine whether the sub-block is the largest among the memory block (S131). When the memory controller 1200 determines that the sub-block is the largest (YES), the memory controller 1200 may add the sub-block to the third sub-block pool (Sub block pool 3) (S141). When the memory controller 1200 determines that the sub-block is not the largest (NO), the memory controller 1200 may add the sub-block to the second sub-block pool (Sub block pool 2) (S151).

As the above-described process, the memory controller 1200 may classify sub-blocks in a memory block into three sub-block pools. The memory controller 1200 may efficiently manage memory space by dividing and managing the sub-blocks according to a capacity of each of the sub-blocks.

Figure 18:
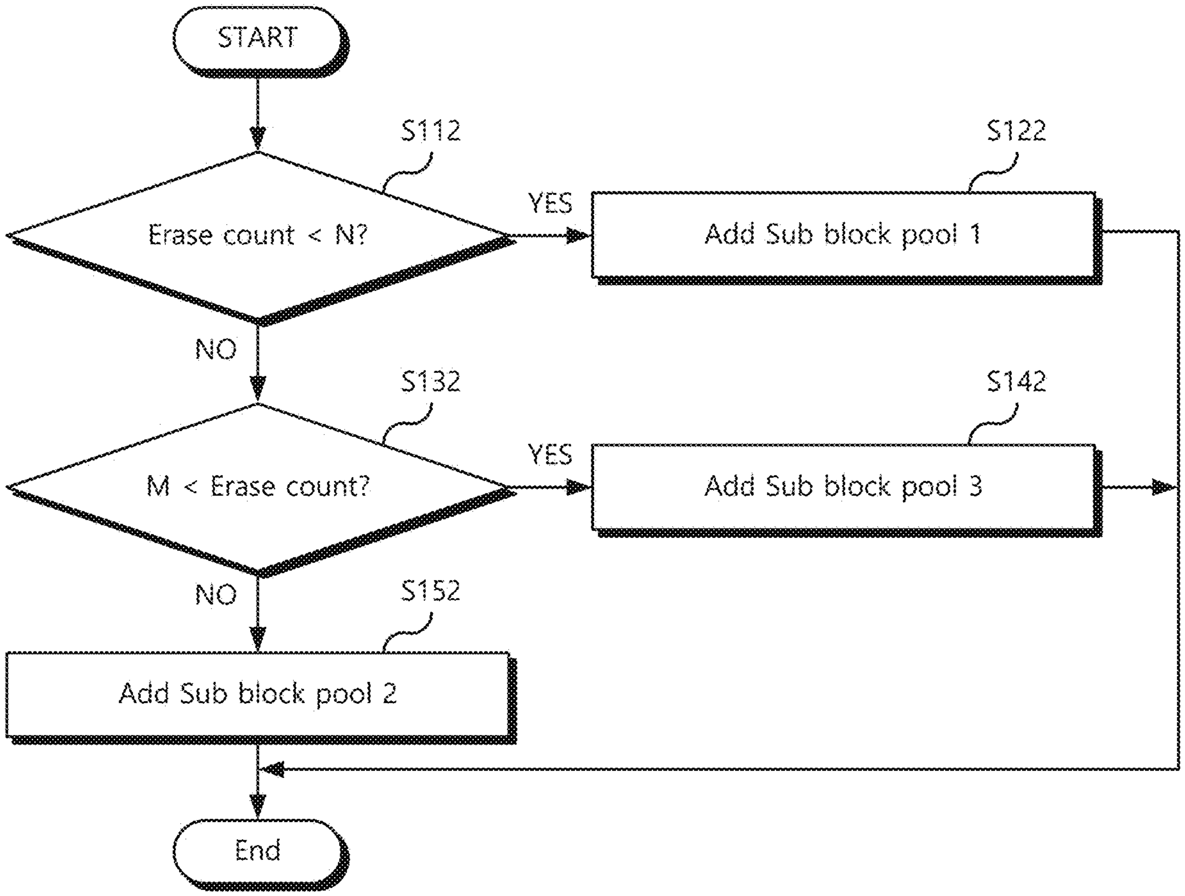
FIG. 18 is a flowchart illustrating an example embodiment of another process configuring the sub-block pool illustrated in FIG. 16.

FIG. 18 is a flowchart illustrating an example embodiment of another process configuring the sub-block pool illustrated in FIG. 16.

Referring to FIG. 18, the memory controller 1200 may add a sub-block to the first sub-block pool. The memory controller 1200 may compare an erase count of the sub-block and reference values N and M. As an example, the first reference value N is assumed to be smaller than the second reference value M.

In operation S112, the memory controller 1200 may determine whether the erase count of the sub-block in the memory block is less than the first reference value N. When the memory controller 1200 determines that the erase count of the sub-block is less than the first reference value N ("Erase count <N?" "YES"), the memory controller 1200 may add the sub-block to the first sub-block pool (Sub block pool 1) (S122).

When the memory controller 1200 determines that the erase count of the sub-block is greater than the first reference value N ("Erase count <N?" "NO"), the memory controller 1200 may determine whether the erase count of the sub-block in the memory block is greater than the second reference value M (S132). When the memory controller 1200 determines that the erase count of the sub-block is greater than the second reference value M ("M<Erase count?" "YES"), the memory controller 1200 may add the sub-block to the third sub-block pool (Sub block pool 3) (S142). When the memory controller 1200 determines that the erase count of the sub-block is less than the second reference value M ("M<Erase count?" "NO"), the memory controller 1200 may add the sub-block to the second sub-block pool (Sub block pool 2) (S152).

As the above-described process, the memory controller 1200 may classify sub-blocks in a memory block into three sub-block pools. The memory controller 1200 may efficiently manage lifespan of the sub-blocks by dividing the sub-blocks according to an erase count. Referring to FIGS. 15 to 17, the memory controller 1200 may add the sub-blocks into sub-block pools. The memory controller 1200 may classify the sub-blocks according to a capacity of each of the sub-blocks. Additionally, the memory controller 1200 may classify the sub-blocks according to an erase count of each of the sub-blocks. The memory controller 1200 may use one method or both methods as needed.

Figure 19:
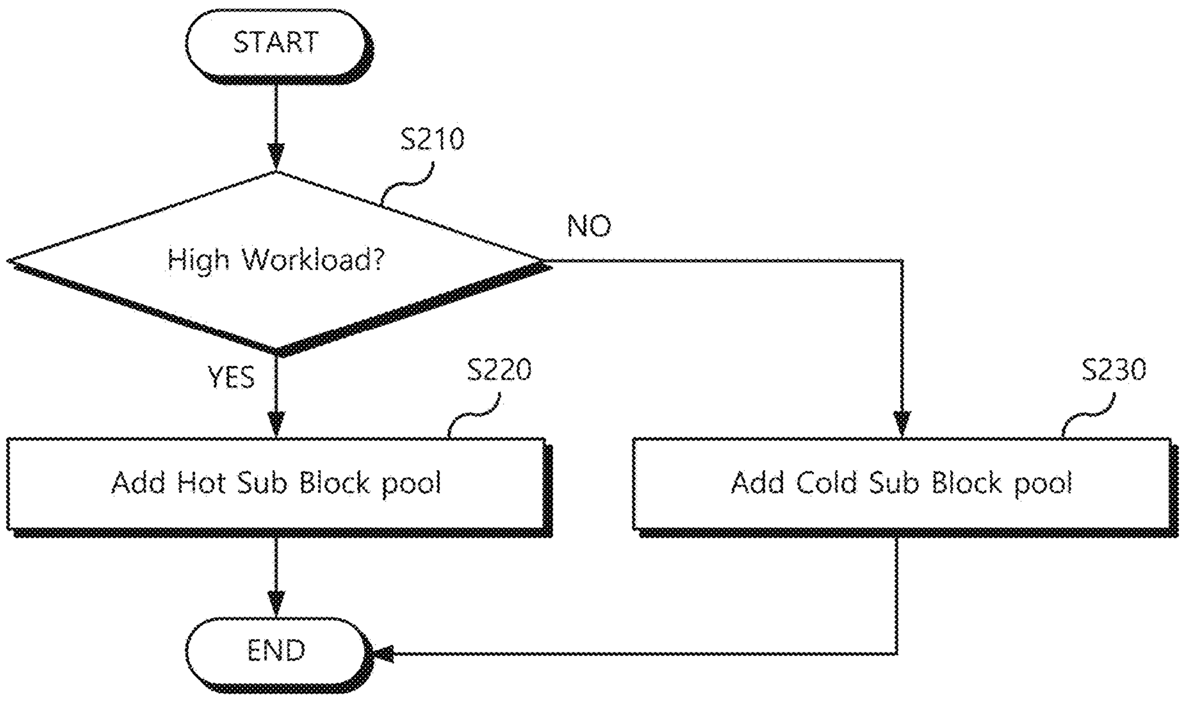
FIG. 19 is a flowchart illustrating an example embodiment of a basic formation process of the sub-block group illustrated in FIG. 16.

FIG. 19 is a flowchart illustrating an example embodiment of a basic formation process of the sub-block group illustrated in FIG. 16.

Referring to FIGS. 15 and 19, the memory controller 1200 may add a sub-block to the second sub-block pool in the sub-block group.

In operation S210 ("High Workload?"), the memory controller 1200 may determine a workload of a user pattern. The workload may mean a load placed on the memory device according to usage patterns.

As an example, a high workload may mean that data are frequently accessed. In some example embodiments, when erase counts of sub-blocks are small, the memory device may be used in balance.

As an example, a high workload may mean that write commands for small data are frequently received. In some example embodiments, when a capacity of a sub-block is small, a waste of memory space may be reduced.

As an example, a high workload may mean that there are many write commands for large data. In some example embodiments, when a capacity of the sub-block is large, the write commands may be executed with a small number of sub-blocks, thereby improving use efficiency of the sub-blocks.

As an example, a high workload is described based on frequent access to small data.

In operation S210, the memory controller 1200 may determine whether a workload is high. When the memory controller 1200 determines that the workload is high ("High Workload?" "YES"), the memory controller 1200 may add a sub-block with a small erase count to a hot data sub-block pool to deal with frequent access (S220).

When the memory controller 1200 determines that the workload is low ("High Workload?" "NO"), the frequency of data access will be low, so a sub-block with a large erase count may be added to a cold data sub-block pool (S220).

As an example, a low workload may include a low data access frequency or a low data write frequency.

Figure 20:
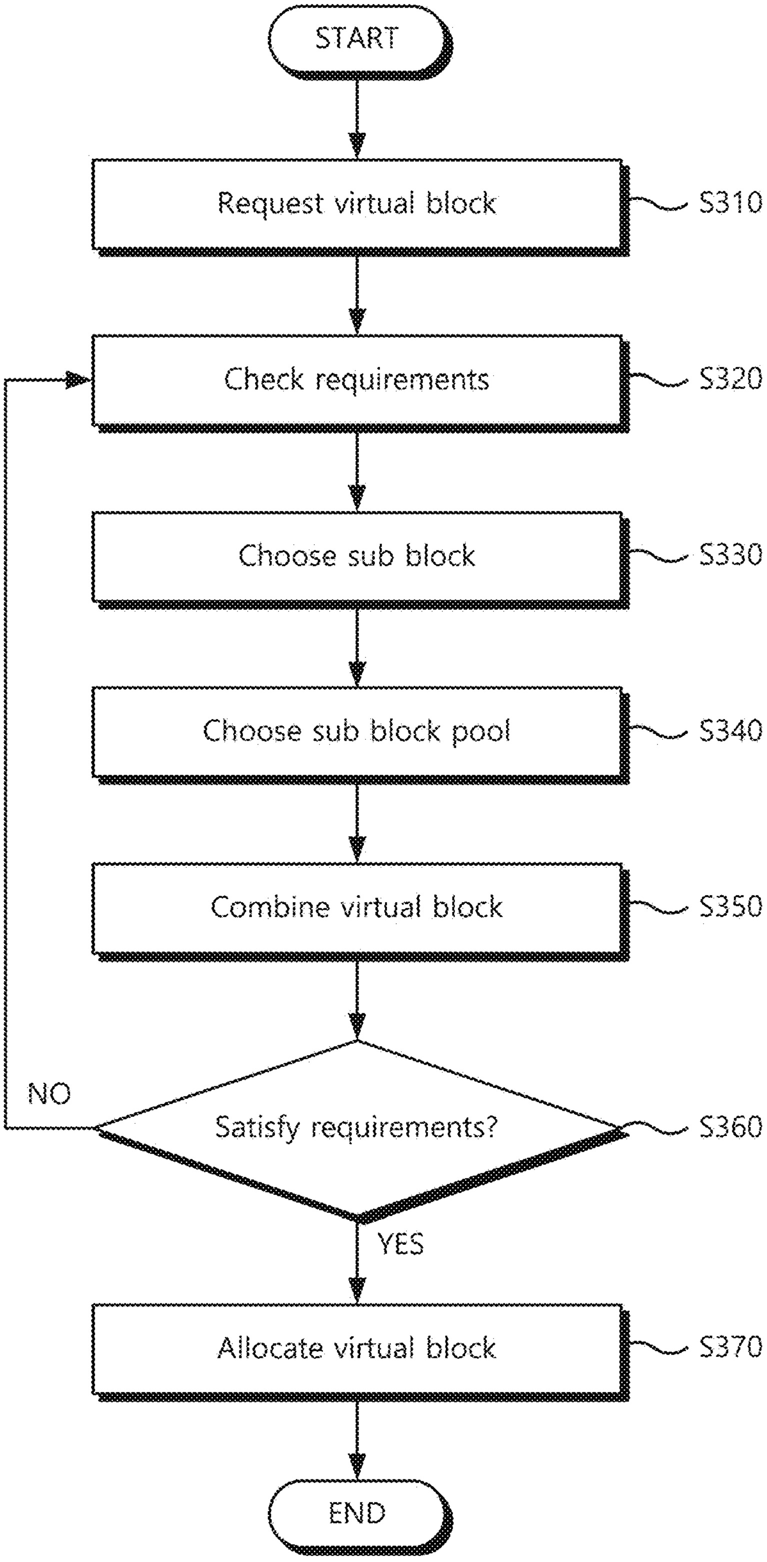
FIG. 20 is a flowchart illustrating an example embodiment of a formation process of a virtual memory block illustrated in FIG. 16.

FIG. 20 is a flowchart illustrating an example embodiment of a formation process of a virtual memory block illustrated in FIG. 16.

Referring to FIGS. 1 and 20, upon a request from the host 1500, the memory controller 1200 may allocate a sub-block to a virtual memory block.

In operation S310, the memory controller 1200 may receive a memory block allocation request from the host 1500.

The memory controller 1200 may allocate a virtual memory block in response to the memory block allocation request.

In operation S320, the memory controller 1200 may check requirements of the host 1500 for a memory block allocation. There may or may not be the requirements from the host 1500. Additionally, when there are the requirements from the host 1500, a data size may be confirmed in the requirements.

In operation S330, when there are no requirements from the host 1500, the memory controller 1200 may select basic sub-blocks. As an example, the basic sub-blocks may refer to sub-blocks included in one memory block. When there are the requirements from the host 1500 and the data size is specified in the requirements, the memory controller 1200 may select sub-blocks with the smallest surplus space.

In operation S340, the memory controller 1200 may select a sub-block pool to add the selected sub-block. As an example, the sub-block pool may be divided according to predetermined criteria (or based on predetermined criteria). The predetermined criteria may include a capacity or an erase count. The memory controller 1200 may add the sub-block selected according to the predetermined criteria to the sub-block pool.

In operation S350, the memory controller 1200 may select sub-blocks in the sub-block pool. The memory controller 1200 may combine a virtual memory block using the selected sub-blocks. The memory controller 1200 may combine the virtual memory block by considering a capacity, an erase count, data access frequency, etc.

In operation S360, the memory controller 1200 may compare the requirements from the host 1500 and the combination of the virtual memory block. The memory controller 1200 may determine whether the requirements are satisfied based on the comparison result. When the memory controller 1200 determines that the requirements are satisfied ("Satisfy requirements" "YES"), the memory controller 1200 may allocate the virtual memory block (S370).

When the memory controller 1200 determines that the requirements are not satisfied ("Satisfy requirements" "NO"), the memory controller 1200 may check requirements again. The memory controller 1200 may proceed with allocating the virtual memory block again according to the requirements.

The embodiments may be described and illustrated in terms of blocks, as shown in the drawings, which carry out a described function or functions. These blocks, which may be referred to herein as the sub-block managing module 1234, the control unit 1210, the address mapping module 1231, the garbage collection module 1232, the wear-leveling module 1233 or the like may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein). The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

According to the disclosure, it may be possible to facilitate management according to characteristics and improve a memory performance, a lifespan and reliability by providing a combination of sub-blocks optimized for requirements of host.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A storage device comprising:

a memory device comprising a plurality of memory blocks, each of the plurality of memory blocks comprising a plurality of sub-blocks, wherein at least two sub-blocks of the plurality of sub-blocks have different sizes; and a memory controller configured to manage the plurality of memory blocks and the plurality of sub-blocks, wherein the memory controller is further configured to:

based on a predetermined sub-block attribute criteria, select at least one sub-block from the plurality of sub-blocks, add the selected at least one sub-block to at least one sub-block pool, and based on the predetermined sub-block attribute criteria, allocate the selected at least one sub-block in the at least one sub-block pool to a virtual memory block, wherein the predetermined sub-block attribute criteria includes at least one of an erase count or a data access frequency of the at least one sub-block.

2. The storage device of claim 1, wherein the plurality of sub-blocks comprise:

a first sub-block with a first capacity being the smallest capacity;

a second sub-block with a second capacity that is larger than the first capacity of the first sub-block; and a third sub-block with a third capacity that is larger than the second capacity of the second sub-block, wherein the memory controller is further configured to:

based on the first capacity, the second capacity, and the third capacity, select one of the first sub-block, the second sub-block and the third sub-block, add the first sub-block to a first sub-block pool, add the second sub-block to a second sub-block pool, and add the third sub-block to a third sub-block pool.

3. The storage device of claim 2, wherein the memory controller is further configured to:

sequentially or randomly select sub-blocks from the first sub-block pool, the second sub-block pool or the third sub-block pool, and add the sequentially or randomly selected sub-blocks to the virtual memory block.

4. The storage device of claim 1, wherein the memory controller is further configured to:

select, from the at least one sub-block pool, a set of sub-blocks having the same capacities, and add the selected set of sub-blocks to the virtual memory block.

5. The storage device of claim 1, wherein the memory controller is further configured to:

select, from the at least one sub-block pool, a set of sub-blocks having different capacities each other, and add the selected set of sub-blocks to the virtual memory block.

6. The storage device of claim 1, wherein the plurality of sub-blocks comprises:

a first sub-block with a first erase count being the lowest erase count;

a second sub-block with a second erase count that is higher than the first erase count of the first sub-block; and a third sub-block with a third erase count that is higher than the second erase count of the second sub-block, wherein the memory controller is further configured to:

based on the first erase count, the second erase count, and the third erase count, select one of the first sub-block, the second sub-block and the third sub-block, add the first sub-block to a first sub-block pool, add the second sub-block to a second sub-block pool, and add the third sub-block to a third sub-block pool.

7. The storage device of claim 1, wherein the memory controller is further configured to:

select, from the at least one sub-block pool, a set of sub-blocks having the same erase count, and add the selected set of sub-blocks to the virtual memory block.

8. The storage device of claim 1, wherein the memory controller is further configured to:

obtain, from the at least one sub-block pool, the selected at least one sub-block, and add the obtained at least one sub-block to a sub-block pool in a sub-block group.

9. The storage device of claim 8, wherein the memory controller is further configured to obtain the selected at least one sub-block, based on at least one of a capacity, the erase count, or the data access frequency.

10. The storage device of claim 8, wherein the sub-block group comprises at least one of a minimum erase count sub-block pool, a hot data sub-block pool, or a cold data sub-block pool.

11. A method performed by a storage device comprising a plurality of memory blocks, the method comprising:

based on a predetermined sub-block attribute criteria, selecting at least one sub-block from a plurality of sub-blocks in the plurality of memory blocks;

adding the selected at least one sub-block to a sub-block pool; and based on the predetermined sub-block attribute criteria, allocating the selected at least one sub-block in the sub-block pool to a virtual memory block, wherein at least two sub-blocks of the plurality of sub-blocks have different sizes, and wherein the predetermined sub-block attribute criteria includes at least one of an erase count or a data access frequency of at least one sub-block.

12. The method of claim 11, wherein the selecting the at least one sub-block from the plurality of sub-blocks comprises:

adding the selected at least one sub-block to a first sub-block pool when a capacity of the selected at least one sub-block is the smallest in one of the plurality of memory blocks;

adding the selected at least one sub-block to a second sub-block pool when the capacity of the selected at least one sub-block is the largest among the plurality of memory blocks; and adding the selected at least one sub-block to a third sub-block pool when the capacity of the selected at least one sub-block is an average among the plurality of memory blocks.

13. The method of claim 11, wherein the selecting the at least one sub-block from the plurality of sub-blocks comprises:

adding the selected at least one sub-block to a first sub-block pool when an erase count of the selected at least one sub-block is less than a first reference value;

adding the selected at least one sub-block to a second sub-block pool when the erase count of the selected at least one sub-block is greater than a second reference value; and adding the selected at least one sub-block to a third sub-block pool when the erase count of the selected at least one sub-block is greater than the first reference value and less than the second reference value.

14. The method of claim 11, wherein the selecting the at least one sub-block from the plurality of sub-blocks comprises:

determining that a workload is high when a data access frequency is higher than a first threshold, data write commands are more frequent than a second threshold, or write commands are performed; and adding, to a hot data sub-block pool, a sub-block having an erase count being smaller than a third threshold.

15. The method of claim 14, wherein the selecting the at least one sub-block from the plurality of sub-blocks comprises:

determining that the workload is low when the data access frequency or a data write frequency is lower than a fourth threshold, and based on a determination that the workload is low, adding the selected at least one sub-block to a cold data sub-block pool.

16. A method performed by a storage device, the method comprising:

receiving, from a host, a virtual memory block allocation requirement;

confirming the virtual memory block allocation requirement;

based on the virtual memory block allocation requirement, selecting at least one sub-block;

selecting a sub-block pool and adding the selected at least one sub-block to the selected sub-block pool;

combining a virtual memory block using the selected at least one sub-block of the selected sub-block pool;

comparing the combined virtual memory block and the virtual memory block allocation requirement and checking whether the virtual memory block allocation requirement is satisfied; and based on a determination that the virtual memory block allocation requirement is satisfied, allocating the virtual memory block.

17. The method of claim 16, wherein the virtual memory block allocation requirement comprises a request for a data size.

18. The method of claim 17, wherein the selecting the at least one sub-block comprises selecting the at least one sub-block with the least surplus space when the virtual memory block allocation requirement comprises the request for the data size.

19. The method of claim 16, wherein the selecting the at least one sub-block comprises selecting the at least one sub-block based on a capacity of the at least one sub-block or an erase count of the at least one sub-block.

20. The method of claim 17, wherein the combining the virtual memory block comprises combining the virtual memory block based on at least one of a capacity of the at least one sub-block, an erase count of the at least one sub-block and a data access frequency.

* * * * *